US011780613B2

(12) United States Patent
Shah

(10) Patent No.: US 11,780,613 B2
(45) Date of Patent: Oct. 10, 2023

(54) TABLET INSPECTION SYSTEM MANUFACTURING MODULE WITH INDIVIDUAL REJECTION METHOD AND VERIFICATION OF REJECTION

(71) Applicant: Jekson Vision Ltd, Ta Xbiex (MT)

(72) Inventor: Rishal Shah, Milan (IT)

(73) Assignee: Jekson Vision Ltd, Paola (MT)

(*) Notice: Subject to any disclaimer, the term of this patent is extended or adjusted under 35 U.S.C. 154(b) by 0 days.

(21) Appl. No.: 17/678,887

(22) Filed: Feb. 23, 2022

(65) Prior Publication Data

US 2022/0267036 A1 Aug. 25, 2022

Related U.S. Application Data

(60) Provisional application No. 63/153,131, filed on Feb. 24, 2021.

(51) Int. Cl.
| | |
|---|---|
| *B65B 57/14* | (2006.01) |
| *B65B 5/10* | (2006.01) |
| *G01N 21/95* | (2006.01) |
| *B65B 57/20* | (2006.01) |

(52) U.S. Cl.
CPC .............. *B65B 5/103* (2013.01); *B65B 57/14* (2013.01); *B65B 57/20* (2013.01); *G01N 21/9508* (2013.01)

(58) Field of Classification Search
USPC .......................................................... 53/52
See application file for complete search history.

(56) References Cited

U.S. PATENT DOCUMENTS

| | | | |
|---|---|---|---|
| 5,135,113 A | 8/1992 | Mayer et al. | |
| 5,191,741 A | 3/1993 | Jones | |
| 8,381,896 B2 | 2/2013 | Ackley et al. | |
| 9,259,766 B2 | 2/2016 | Ackley et al. | |
| 2009/0056825 A1* | 3/2009 | Mertens | B65B 57/10 141/83 |
| 2010/0139222 A1 | 6/2010 | Federle et al. | |
| 2020/0115088 A1* | 4/2020 | Fahey | B65B 57/20 |
| 2021/0086934 A1* | 3/2021 | Burkett, Jr. | B65B 59/04 |

FOREIGN PATENT DOCUMENTS

| | | |
|---|---|---|
| EP | 1251073 A1 | 10/2002 |
| EP | 2048082 A1 | 4/2009 |
| JP | 2006026469 A | 2/2006 |
| JP | 2008039645 A | 2/2008 |
| JP | 4310616 B2 | 8/2009 |

* cited by examiner

*Primary Examiner* — Chinyere J Rushing-Tucker
(74) *Attorney, Agent, or Firm* — Intellectual Property Law Group LLP

(57) ABSTRACT

A tablet inspection and rejection verification module designed to integrate into a manufacturing line for tablets. The module being magnetically separable into a rejection portion, verification portion, and rejection collection portion of the module for easy replacement or cleaning. The module having a design to work in multi-channel tablet filling equipment. The module operates based on a predetermined good-bad inspection that communicates to the module that a tablet(s) needs to be removed from the filling process, and wherein the module upon rejection also has a method of verification of defective tablets moving in the good-tablet channel resulting in bottle rejection.

10 Claims, 24 Drawing Sheets

TABLET INSPECTION SYSTEM MANUFACTURING MODULE WITH INDIVIDUAL REJECTION METHOD AND VERIFICATION OF REJECTION

CROSS-REFERENCE TO RELATED APPLICATION

This application claims priority to U.S. Provisional patent application Ser. No. 63/153,131, filed on Feb. 24, 2021, which is hereby incorporated by reference in its entirety.

FIELD OF THE INVENTION

The present invention relates to modular inspection and rejection systems of pharmaceutical products, more particularly to a bulk counter manufacturing visual inspection system while being packed into containers, along with accurate ejection/diverting system of individual rejection and verification of the rejected product mechanism based on predetermined rejection criteria.

BACKGROUND

Product inspection is very critical to any manufacturing operation but such inspection is of utmost importance when it comes to manufacturing of pharmaceutical products. Traditionally, quality control in the pharmaceutical industry is related to type, purity, and amount/quantity of ingredients in a tablet or capsule. However, quality control also relates to defects which can be detected by visual inspection such as dirt, surface blemishes, surface chips, broken and foreign substances. Although many visual inspections can be performed manually by operators, manual inspections can be slow, expensive and subject to each operator error. Thus, automated systems for quality control in the pharmaceutical industry are extremely important in the manufacture of tablets, and specifically pharmaceuticals that require higher health and safety standards. Currently, there are several existing types of inspection systems for pharmaceutical products.

Prior art references such as, U.S. Pat. No. 5,135,113 disclosed a high-speed tablet sorting machine which is based on the basic principle of capacitance, wherein the weight of a tablet can be determined within precise limits by passing the tablet through a capacitance sensor. Depending on the sensed capacitive measurement, the tablets are diverted into one of two paths: 1) to an appropriate collection bin or 2) to a rejection bin. Also, U.S. Pat. No. 5,191,741 discloses automatic systems such as the fluidized bed bottle filling system that provides advantages in the time taken to fill a given container but are deficient in the ability to provide a filled container that consistently contains the correct number, quality and type of tablets for use by a consumer.

Over time, inspection systems evolved as motivated by the need for increased accuracy and ease of operations. Earlier know techniques for inspection include inspection systems using light; an inspection using a metal detector; inspection using a magnetic sensor or X-ray system. These techniques are disclosed by various Japanese Patents published under nos. JP2006026469A and JP2008039645A. These disclosed techniques are such wherein the foreign substances or defective products are inspected by analyzing the images obtained by photographing objects, and the foreign substances or defective goods are separated from the others. Even an inspection system for a flat tablet using image capturing was disclosed in Japanese Patent 4,310,616 B2 wherein the disclosed system captures an image by photographing the front, back and all sides of a flat tablet and also detects the presence or absence of an appearance defect by performing image processing on the captured image. The disclosed invention also separates and collects defective tablets having poor appearance and non-defective tablets that have no bad appearance without applying any excessive load on the tablet. European Patent Application No. 1,251,073 disclosed a method for selecting, counting, and validating articles, in particular pharmaceuticals, that was based on considering the articles, moved in a continuous flow, as non-integral until the integrity characteristics are detected by deflecting means for deviating the integral articles to pre-selected containers. But the major drawback with this technology was that such system was effective in counting only opaque pharmaceutical articles and validating them. Another limitation which hindered the efficacy of the above system, was that it does not make available any means or process that can prevent an object of different nature from reaching to the container.

European Patent Application 2,048,082 implemented a method for counting and validating discrete articles, which are to be introduced into containers, and an apparatus for actuating the method, which method includes distancing the articles from one another in a thinning-out section, and making the articles, cross a detection zone, such as to induce a consequent reactance variation in at least a variable reactance sensor. But these were not successful in the pharmaceutical field as these machines required a long non-operating time necessary to replace filled containers with empty ones for receiving integral articles. Such systems also require extensive maintenance operations and their installation, managing, cleaning and control system are very expensive.

There are several other sorting and inspection machines wherein detecting means, including suitable sensors or video cameras, are connected to known systems of image processing and control, associated to corresponding deflector means. The deflector means sends the analyzed articles toward suitable containers for integral or non-integral articles, in relation to the signals coming from the processing and control means. U.S. Patent Publication No. 20100139222 disclosed a product filling system comprising of a camera system coupled to the controller, the camera system disposed in proximity to the plurality of belts to inspect each of the plurality of products along with a controller that controls the driving device to independently move each of the plurality of belts.

U.S. Pat. No. 9,259,766 discloses an inspection system and method for inspecting a predetermined characteristic of a pellet shaped article. The pellet shaped articles are in a row and along a predetermined path, the articles are removed by suction, sensing a predetermined characteristic of that particular article and then by application of suction those articles are segregated into either a rejection bin or accepted bin. The removal unit includes a rotatable ejection drum having extended vacuum nozzles and each vacuum nozzle selectively removes the predetermined article from the carrier bars.

U.S. Pat. No. 8,381,896 disclosed the details of the ejection system of the same wherein the ejection system is structured to selectively accept or reject a tablet from the carrier link which is designed to be used on a single-lane tablet conveying system. However, conventional inspection systems combined with filling machines fail to achieve the level of inspection needed, and also fail to include necessary safeguards for ensuring that products determined as defective are not inadvertently packaged or bottled. The dangers correlated to an eventuality of this type necessitate their prevention, as such a danger puts a person's life at risk when unknowingly ingesting a pharmaceutical product comprising an active ingredient is defective and is a major public healthcare hazard.

The inspection systems known so far are used for inspecting only a single kind of product with inefficient rejection systems. The methods and systems disclosed in the above references, demonstrate that it is not easy to maintain accuracy, quality and safety unless the manufacturing process not only has an efficient rejection method of defective products, but also verifies the rejection of defective products. The counter risk is that if the rejection system removes more than the defective product, then the manufacturing becomes less efficient and significantly more expensive.

Commonly used technology in the pharmaceutical industry is a tablet filling machine (bottle filler) which detects a broken tablet and rejects the bottle. This type of operation not only reduces the overall output and overall line efficiency but also increases the cost to finished goods.

Although the above references were aimed at providing solutions for automating the inspection of pharmaceutical products, there continues to be a motivation in this field of art for alternative automated inspection systems that are accurate and easily installed on existing machinery. The present invention finds the middle ground of high rejection accuracy of defective product, while increasing efficiency by verification that acceptable products are not also removed during the inspection and filling process. The present invention allows for rejection of the product in a continuous inspection and filling process without stopping the machinery/equipment by adding a rejection and verification on an existing product filling machine.

Without limiting the scope of the present invention, a brief summary of some of the claimed embodiments of the present invention is set forth below. Additional details of the summarized embodiments of the present invention and/or additional embodiments of the present invention may be found in the Detailed Description of the present invention below.

SUMMARY OF THE INVENTION

It is therefore the primary objective of the present invention to provide a modular device for rejection and verification that can be integrated into pre-existing multi-channel tablet manufacturing process systems, wherein the predetermined rejection criteria of that system communicate which tablets are to be rejected to the modular device that rejects the identified product and verifies the rejection of the product along with the number of approved products.

It is another objective of the present invention to provide the continuous rejection from multiple tablet channels of any defective products with the help of airblow/airflow mechanism based nozzles/solenoids/monoblock or any such kind placed at a prefixed angle to make sure the defective product is collected into the rejection bin to achieve the 100% rejection rate.

It is another objective of the present invention to provide the continuous rejection from multiple tablet channels of any defective products as communicated to the modular unit as to the identified tablet channel which then rejects and verifies the rejection of defective tablets, the channels being attached to an acceptance area to ensure verification of all rejected tablets are being relocated to a rejection bin, thereby creating faster, safer, and more accurate product is continuing down the tablet channels to a final bottle.

It is another objective of the present invention to also provide accurate results by verifying that in case a defective tablet falls into the bottle during the rejection cycle the system will provide an output and communicate to reject the entire bottle during the continuous inspection and filling process.

It is another objective of the present invention to provide a rejection and verification module that is easily removable from a multi-channel production line, for faster replacement or cleaning of the module, with minimal disruption to the inspection and filling process.

It is another objective of the present invention to provide a rejection and verification module that is magnetically detachable and assembled, so as to quickly allow for cleaning or replacement of parts, which decreases the time for maintenance and replacement.

It is another objective of present invention to provide a real time vision inspection system (103) that inspects moving product on the vibrating channels and identifies product as Good or Defect. Products identified as Good, fall to bottle filling funnels and products identified as Defect are rejected by airblow/airflow in the rejection bin (502).

These and other objects of the invention will be appreciated by reference to the drawings of the invention and to the detailed description of the preferred embodiment that follow, it being understood that not all objects are necessarily simultaneously attained by each aspect of the invention, and that not all objects are necessarily fulfilled by each claim of the application.

BRIEF DESCRIPTION OF THE DRAWINGS

The invention will be readily understood by the following detailed description in conjunction with the accompanying drawings, wherein like reference numerals designate like structural elements, and in which.

In order to achieve the above objects, the present invention, as a first embodiment separates and collects defective tablets/capsules along with a verification mechanism to ensure the final product has been adequately rejected. The present invention is directed to an automatic tablet/capsules filling system, which enhances the productivity, accuracy and quality by using mechanical configuration, and refined sensing and controlling of the reject defective product into the final packaging of the product.

The present invention not only accommodates different sizes, shapes of tablets or capsules without a need for changes in system set up but also includes elimination of direct operator involvement during normal operation and the ability to continue the bottle filling system. The main advantages of the present invention are enhanced assurance of product quality, fast batch-to-batch changeovers and reduced operating costs, maintenance and manpower needs.

DETAILED DESCRIPTION OF SPECIFIC EMBODIMENTS

The illustrated embodiments of the invention will be best understood by reference to the drawings, wherein like parts are designated by like numerals or other labels throughout. The following description is intended only by way of example, and simply illustrates certain selected embodiments of a modular manufacturing section for the rejection and verification of product that the system has communicated should be rejected from the manufacturing process as claimed herein.

FIGS. 1-7C depict an embodiment of the present invention.

Figure 1:
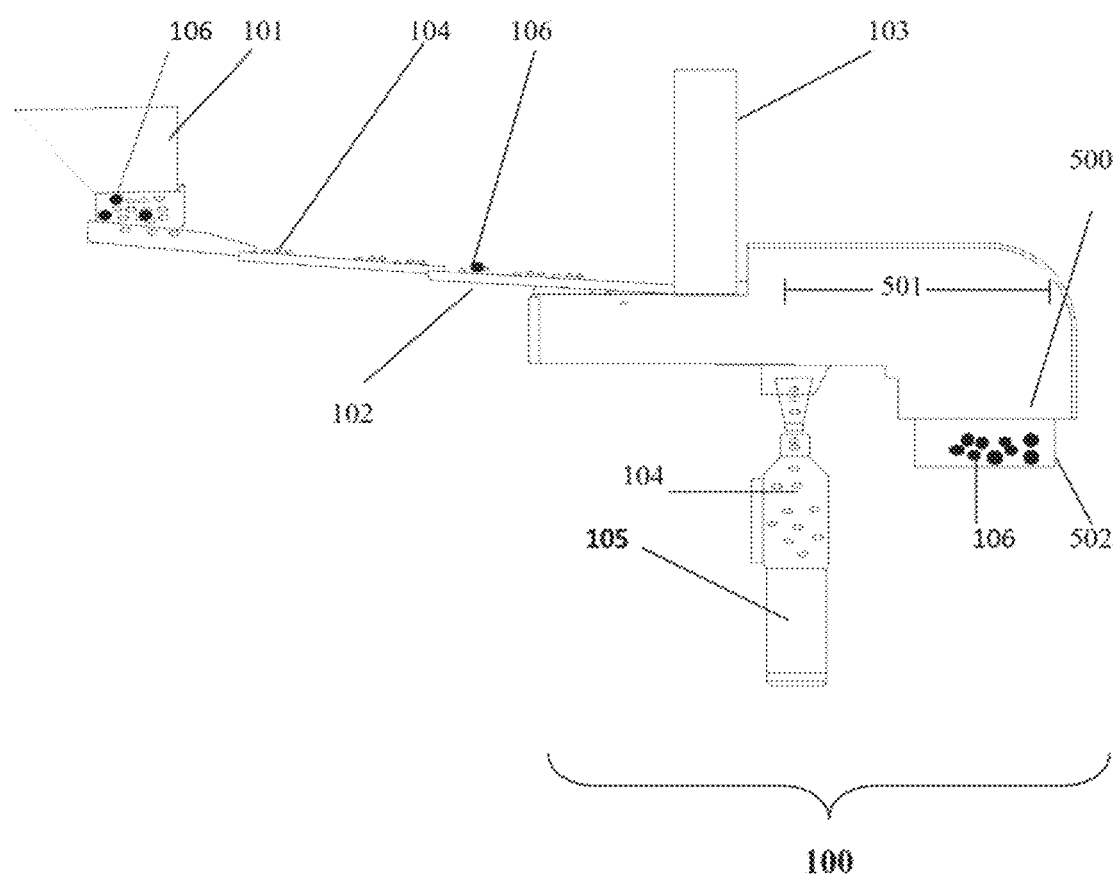
FIG. 1 is a schematic view of the rejection and verification module according to an embodiment of the present invention that mounts on an automatic/online tablet-filling machine.
Figure 2A:
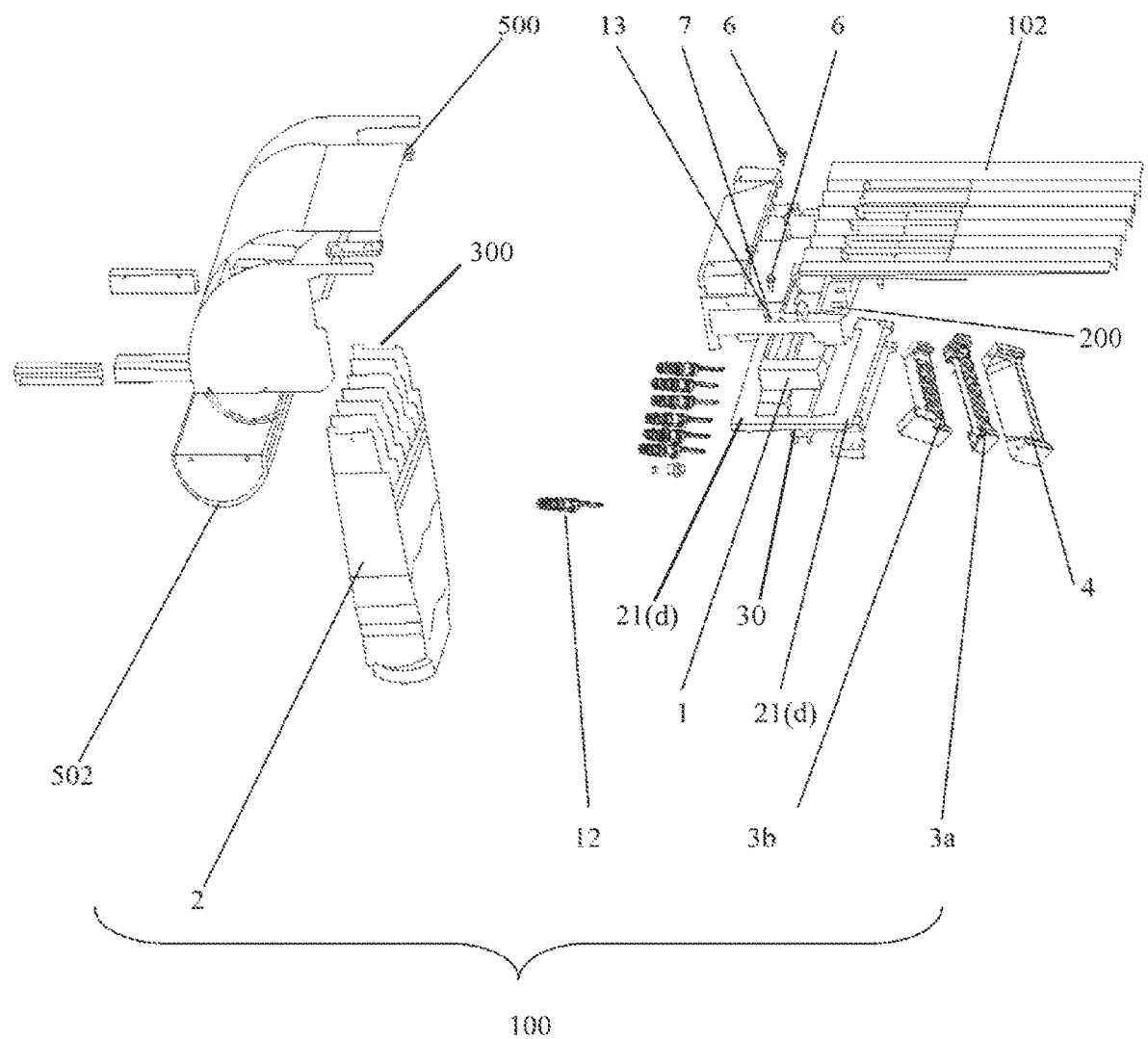
FIG. 2A is an exploded view of the rejection and verification module according to a preferred embodiment of the present invention.

A modular rejection and verification system 100 embodied in the present invention is modularly adaptable to be installed at the end of a multi-channel tablet inspection and filling system as shown in FIG. 1. FIG. 2A illustrates an exploded view of the modular rejection and verification system 100 (also referred to as the rejection and verification module 100 or table inspection system/module 100). As shown in FIG. 1, the modular rejection and verification system 100 is depicted by the bracket. The conveyor system with hopper 101 and vibratory tray 102, and related inspection system 103, are not claimed as part of the preferred embodiment, except to the extent that the preferred embodiment claims that the inspection system 103, is required to communicate with the module to identify the tablet(s)/products for rejection.

In the preferred embodiment, the modular rejection and verification system 100 is made up, in part, of a subassembly of two magnetically connected 13 parts comprising the horizontal multi-channel tablet approval or rejection segment 200, and the vertical multi-channel verification segment 300.

In the preferred embodiment, as depicted in FIGS. 2A-2F, the module is made up of multiple tablet channels 2A that are aligned with the vibratory tray 102 as shown, wherein the tablets 104 and 106 are advanced down the channels by vibration of the module 100. Upon receiving a defect signal, by channel(s) and tablet(s), from the inspection system 103, as tablets/products exit from the channels 2A from the vibratory tray 102 the defective product is blown/rejected into a rejection bin 502 by a burst of air from an air valve 12 associated with each horizontal channel 2A, wherein the tablet is blown in a trajectory (movement of tablet through the rejection chute) into rejection bin 502, avoiding the vertical verification channel 2.

If, during the rejection cycle a defective tablet(s) falls through the respective verification channel 2, the tablet(s) passes through a horizontal light curtain of sensors 21d that communicates that the tablet(s) that had been defective during the inspection process has not been rejected and thus the entire bottle should be discarded.

A modular rejection and verification system 100 embodied in the present invention comprises of the following parts as shown in FIGS. 2A, 2B, 2C, 2G, 3A and wherein the horizontal multi-channel tablet approval or rejection segment 200 comprises of a manifold rejection segment 1, a manifold rejection segment cover 3 which comprises of dust port 3a and tablet diverter 3b along with a manifold rejection segment end part 4 connected to the manufacturing line. The pneumatic air valves 12 blow airflow under a prefixed angle to make sure the identified defective tablet is blown in a trajectory (movement of table through the rejection chute) directly into rejection bin 502. The pneumatic tubing or air inlet 14 and air couplings 16 and 17 are connected with electrical coupling which is used to supply air to the manifold rejection segment 1 for the pneumatic valves 12 that are integrated with the manifold rejection segment 1 and protected with the manifold rejection segment cover 3, and the pneumatic valves 12 are connected to electrical components 19 and 20. As shown in FIGS. 2A-2G, the verification segment 300 is attached to the manifold rejection segment 1 with the help of magnets 13, a magnet holding plate 7, a magnet holding plate mounting pin 8 and magnet housing designed to support the magnets in the manifold rejection segment 1.

The vertical multi-channel verification segment 300 comprises the verification sensor 21d on both the sides along with lower verification housing 30, circuit board 21, circuit board mounting plate 21(b), and airblow eject nozzle 12 (i.e. pneumatic valve).

Figure 3A:
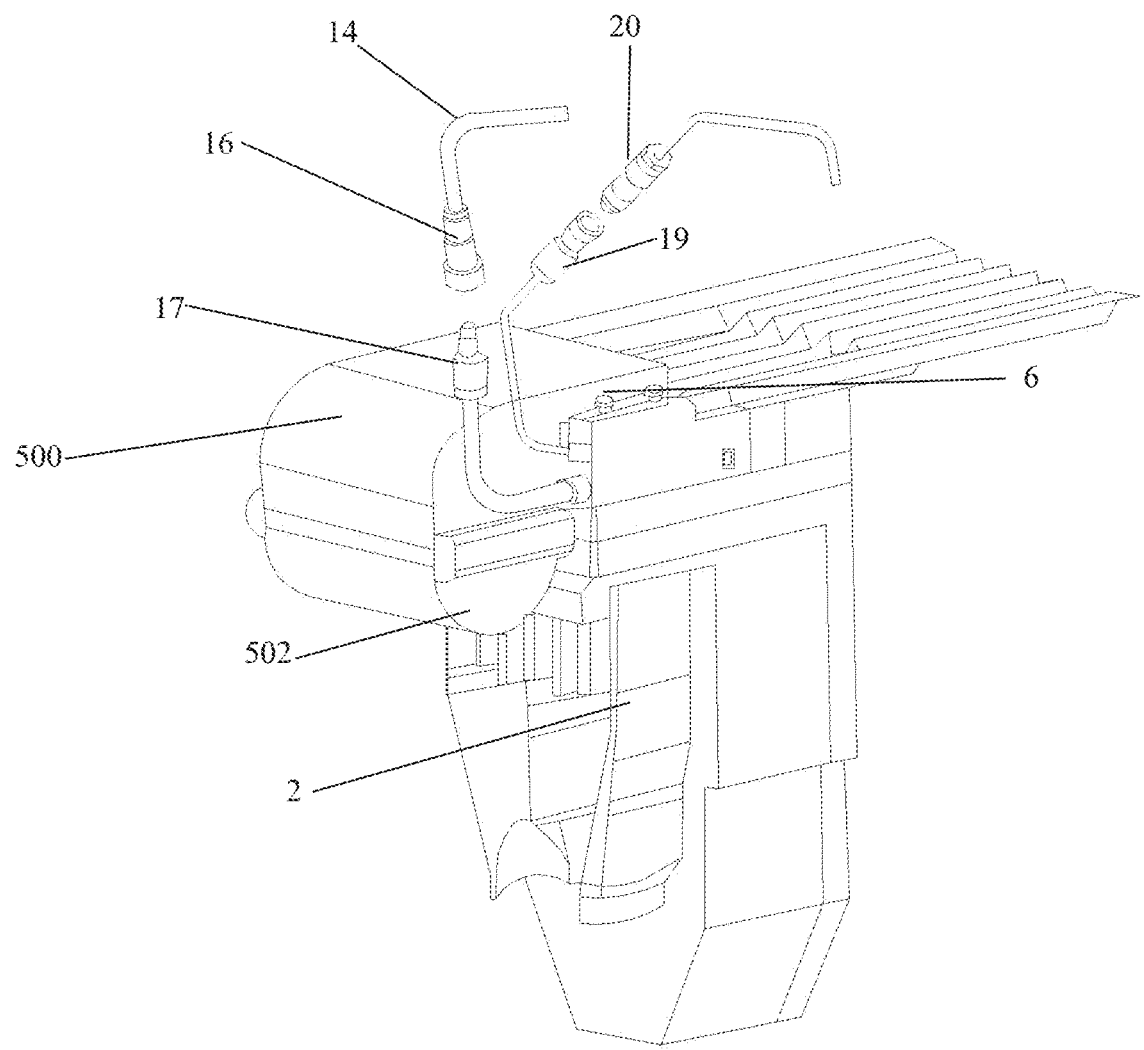
FIG. 3A is a perspective rear view of the vibrator plate, rejection bin, and funnel of the rejection and verification module, according to an embodiment of the present invention.
Figure 3B:
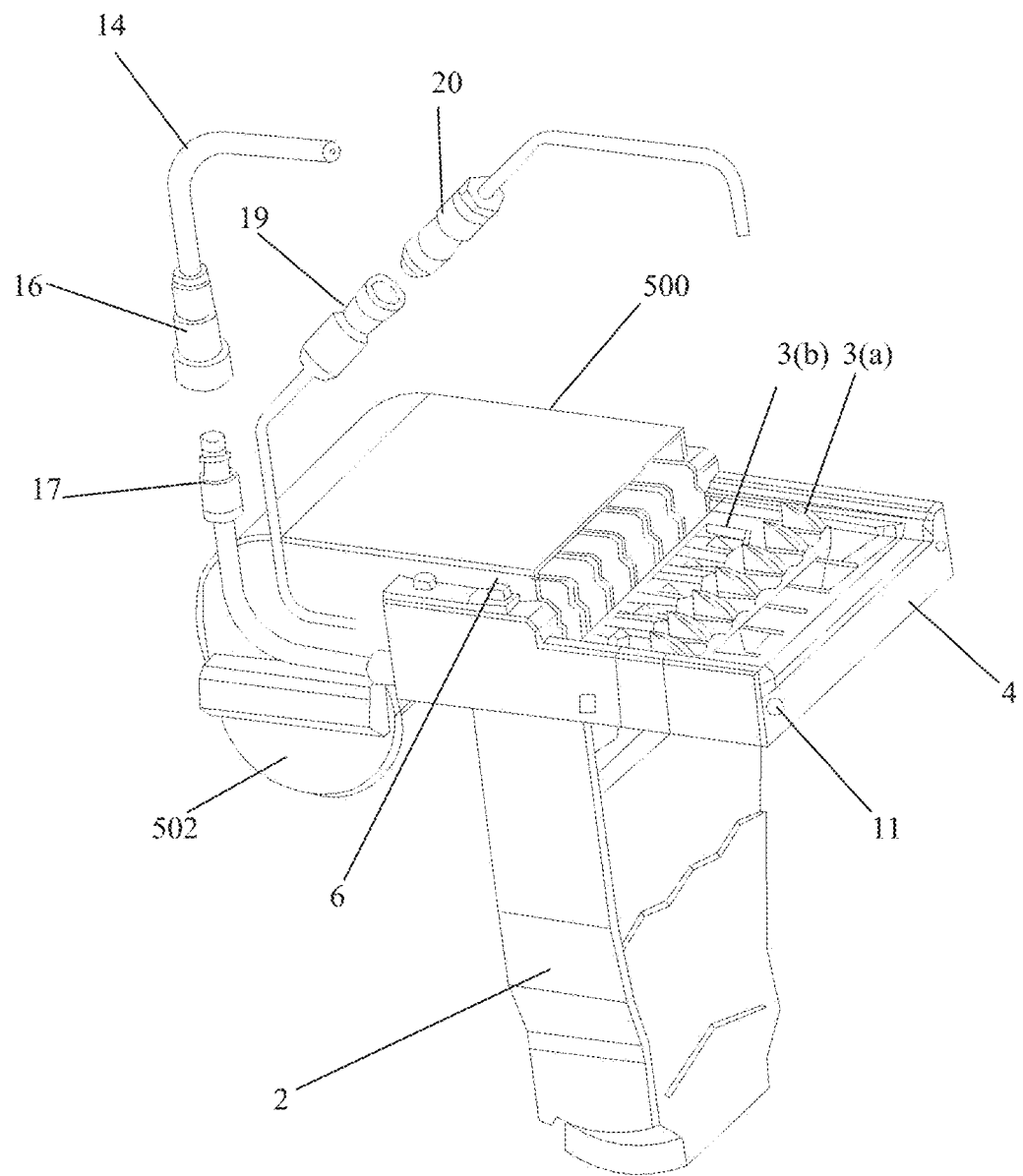
FIG. 3B is a perspective front view of the rejection bin and funnel of the rejection and verification module, according to an embodiment of the present invention.

FIGS. 3A and 3B depict a perspective rear and front view of a modular rejection and verification system showing the rejection bin 502, funnel verification assembly 2 of the rejection and verification module, and manifold rejection segment end part 4, that are fixed by bolts 11.

Figure 7A:
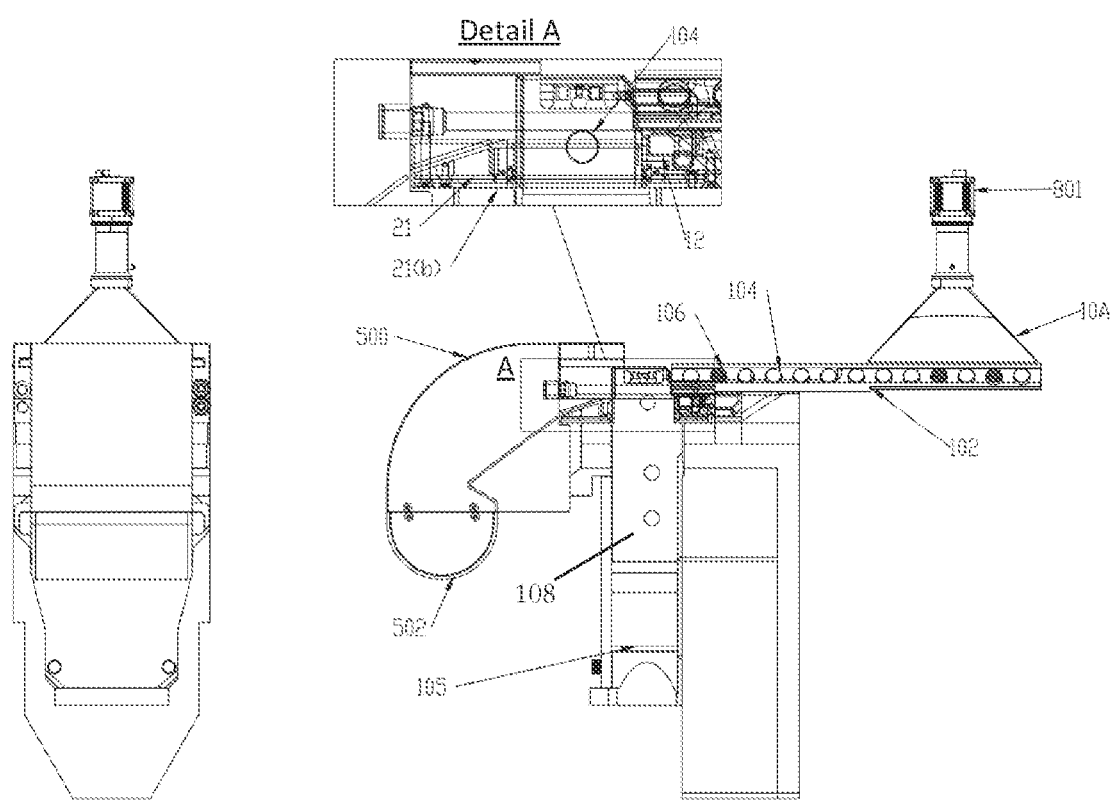
FIG. 7A illustrates a detailed cross-sectional view taken from the side view of the rejection and verification module showing good tablets falling to the acceptance area, according to an embodiment of the present invention.
Figure 7B:
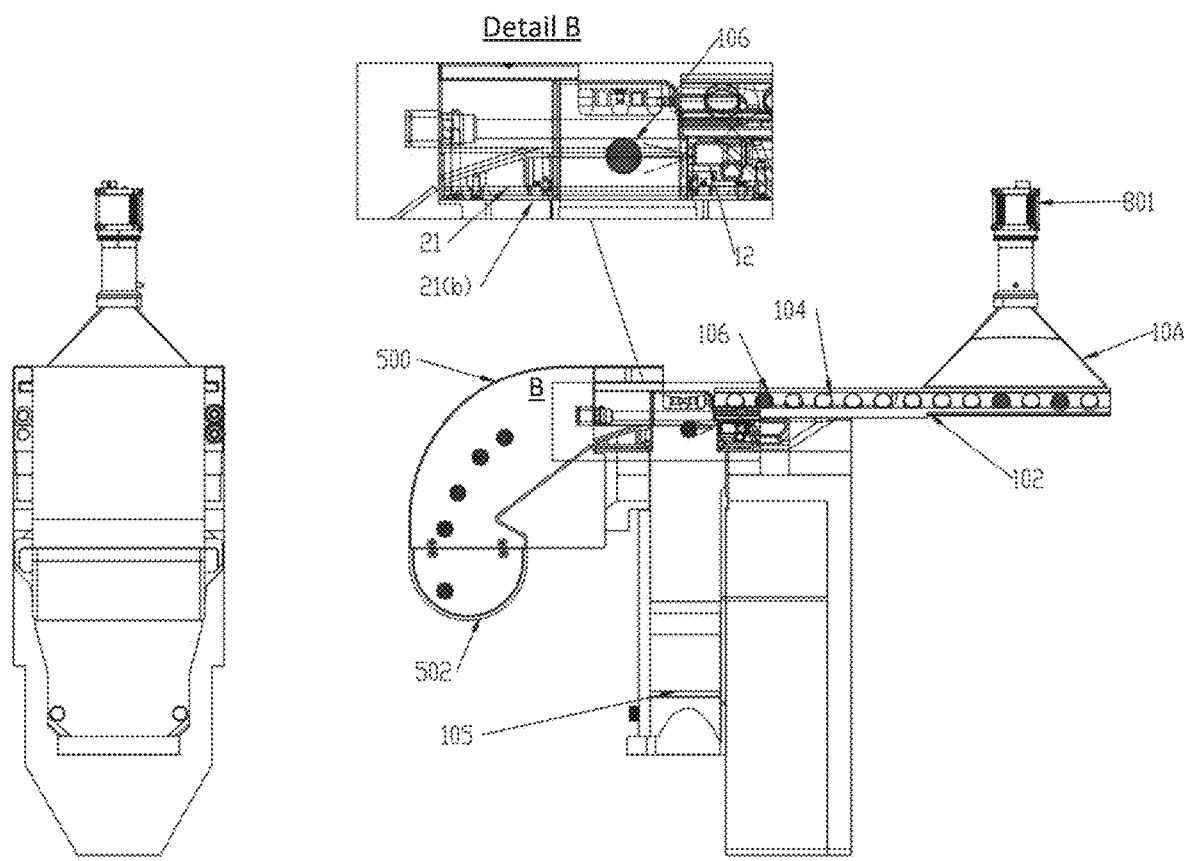
FIG. 7B illustrates a detailed cross-sectional view taken from the side view of the rejection and verification module showing rejection of the rejected tablet to the rejection bin, according to an embodiment of the present invention.
Figure 7C:
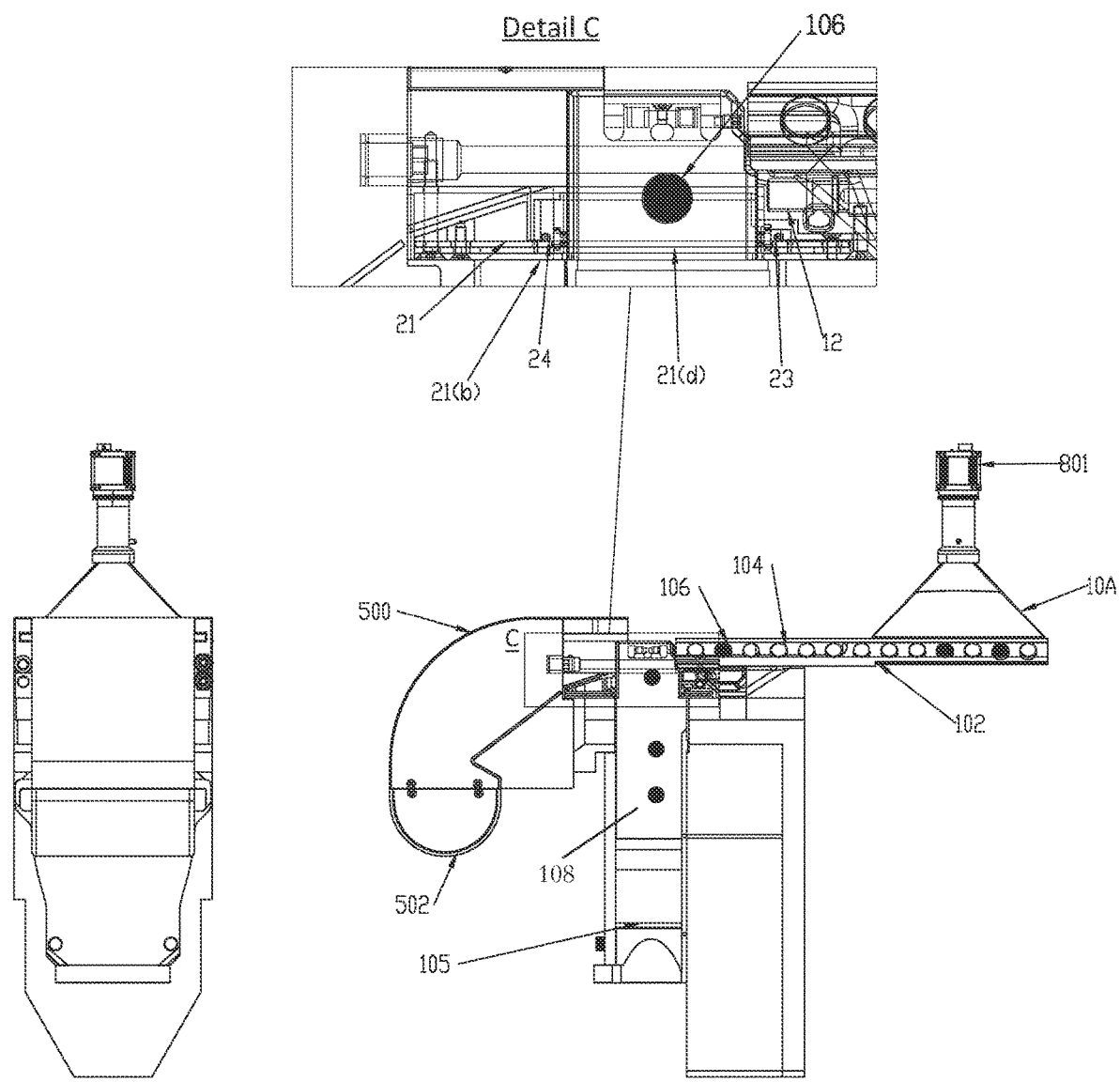
FIG. 7C illustrates a detailed cross-sectional view taken from the side view of the rejection and verification module showing defective tablets, falling to the acceptance area which will activate the reject verification, according to an embodiment of the present invention.

FIGS. 7A, 7B and 7C illustrate three different scenarios wherein the good tablets 104 are shown falling in an acceptance area 108, rejected tablets 106 are shown falling in the rejection bin 502, and rejected tablets 106 are shown falling in the acceptance area 108.

As shown in each side view of the module/system 100, a camera 801 inspects the channels 2A at the inspection zone 10A while product moves along the vibratory tray 102. The verification sensor 21d as shown in the figures comprises a circuit board 21 and the IR LED 23 and IR diode 24.

Figure 8:
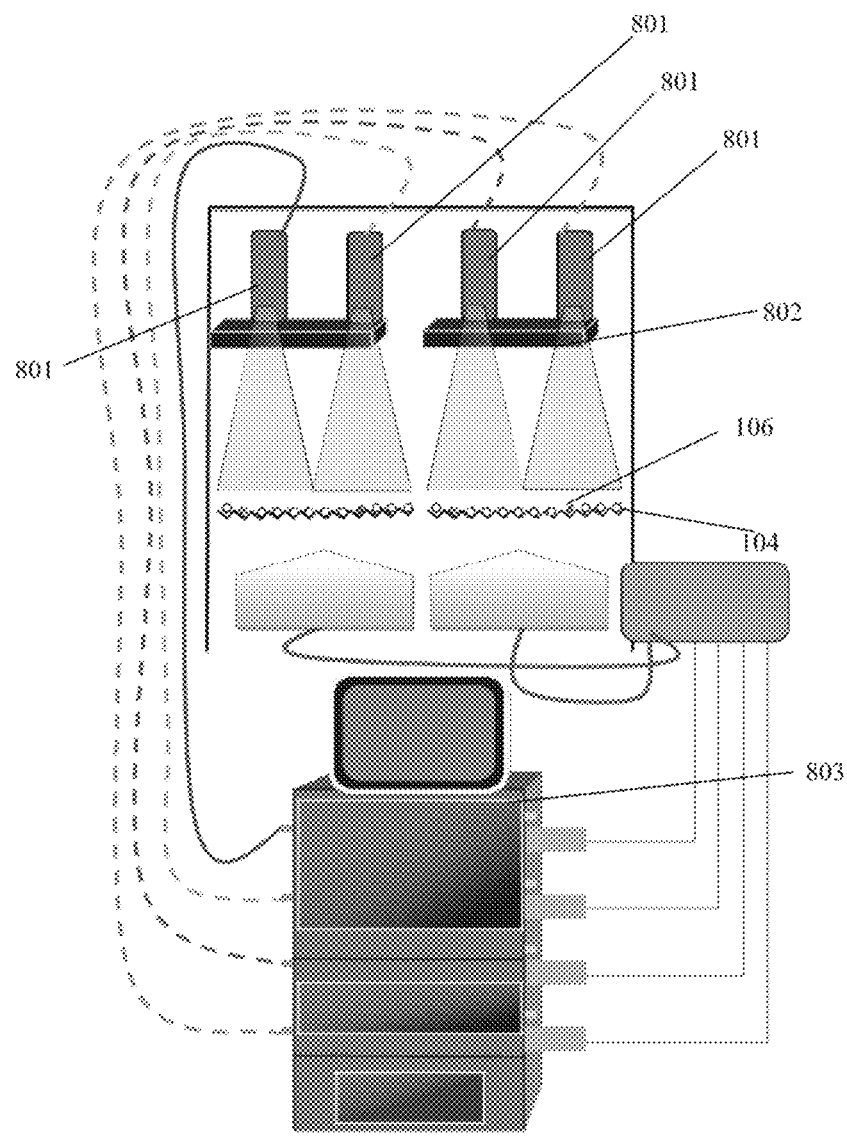
FIG. 8 represents a block diagram lateral view of a tablet bottle filling machine with the mounted inspection and rejection system (Prior Art) that interfaces with the tablet inspection and filling module (not shown).

FIG. 8 depicts the inspection system (Prior Art).

A modular rejection and verification system 100 embodied in the present invention is modularly adaptable to be installed at the end of a multi-channel tablet manufacturing system like any 6/8/12/16/24-track electronic counting machine wherein one camera 801 inspects six channels. Therefore, for 24 tracks there are a number of four cameras as illustrated.
there is a total of two light units 802, one unit per 12 channels. This light unit is in continuous ON mode.
software screen displays 803 images of all cameras on a touch screen monitor.

Once the inspection is started, all cameras 801 will start inspection. If any defects are found in the product, a rejection signal will be given to the respective pneumatic valve 12 of a particular channel. (See FIG. 7B) Once the pneumatic valve 12 is ON, the rejection mechanism will blow the defective tablet 106 under angle from a particular channel 2A from the vibratory tray 102 and it will be collected in rejection collection bin 502.

In case the verification sensor 21d senses any rejected tablet falling then the software will provide an output to the bottle filling machine to reject the entire bottle.

FIGS. 2E-2I illustrate the verification system, which senses any rejected tablet falling into the acceptance area, according to an embodiment of the present invention. As shown, the pneumatic air valves 12 and dust port 3a are attached to the PCB assembly comprising the circuit board 21, circuit board mounting plate 21(b), IR LEDs 23, and IR diodes 24.

The following paragraphs describe preferred embodiments of the device according to the present invention. The claimed subject matter is described with reference to the drawings, wherein like reference numerals are used to refer to like elements throughout. It will be obvious to a person of ordinary skill in the art will be aware that the activities described are only exemplary and several variations are possible, all of which are understood to fall within the scope of this disclosure. In other instances, well-known structures and devices are shown in block diagram form in order to facilitate describing the subject innovation. Moreover, the drawings may not be to scale. Accordingly, the specification and figures are to be regarded in an illustrative rather than a restrictive sense, and all such modifications are intended to be included within the scope of present invention. Any benefits, advantages, or solution to problems that are described herein with regard to specific embodiments are not intended to be construed as a critical, required or essential feature or element of any or all the claims. For the following defined terms, these definitions shall be applied, unless a different definition is given in the claims or elsewhere in this specification. As used in this specification and the appended claims, the singular forms "a", "an", and "the" also include plural referents unless the content dearly dictates otherwise. As used in this specification and the appended claims, the term "or" is generally employed in its sense including "and/or" unless the content dearly dictates otherwise. "Air Valve" is referred to and interchangeably with "Pneumatic valve" and "Air Reject Nozzle". "IR phototransistor" is interchangeable with "IR LED". The term "Tablet" is understood in the present context as any product, compound, medicine which is subject to regulation as a drug, medicine or controlled substance. For example, this can be a tablet, capsule, pill or any nutraceutical or cosmeceutical oral drug.

With reference to FIG. 1, the present invention comprises of a tablet conveyor system with hopper 101 and vibratory tray 102, an inspection system 103, a tablet rejection box assembly 500, a rejection chute 501, a rejection collection bin 502, a vertical multi-channel verification segment 300, and a filling station control 105. Each of the above-listed systems and control will be described hereinafter under separate headings.

Tablet Conveyor System/Bottle Filling Machine

The tablet conveyor system as described in FIG. 1 includes a tablet hopper 101, which can be filled using any conventional tablet source. The tablet hopper 101 is stainless steel and can be mounted onto a stainless framework using a pivot, which enables the hopper to be pivoted from the vertical to the horizontal for easy cleaning. The tablet hopper 101 is used to feed a vibratory tray 102 through four separate discharge ports of chutes (not shown) from the hopper gate valve. The tablets 104, move along the vibratory tray 102 and pass through an inspection system 103, that tracks and inspects tablets for various defects while they move on the V-shaped/U-shaped/flat bottom shaped channels of the tablet conveyor system. The track and inspect approach assigns reliable accept/reject tags to individual products. The inspection system 103 processes and tags each tablet for the rejection box assembly 500 or the filling station control 105.

The inspection system 103 as shown in FIG. 8 inspects the following defects for tablets such as:
broken products.
diameter/length variation.
shape variation.
color spot on the products (if the spot on the product is seen by camera).
chipping in coated tablets (if the chipping is seen by camera).
foreign products/objects.

The inspection system 103 inspects the following defects for capsules such as:
- cap/body missing.
- foreign products/objects.

The tablets 104 that are verified and approved by the inspection system 103, pass to the bottle filling station control 105 and the rejected tablet 106 is collected into the rejection box assembly 500.

Tablet Inspection System Module

With reference to FIG. 1 and FIGS. 2A-2I, a modular rejection and verification system 100 embodied in the present invention is modularly adaptable to be installed at the end of a multi-channel tablet manufacturing system. The modular rejection and verification system 100 in accordance with the present invention comprises a mechanism that works by way of air blown under a prefixed angle activated by the pneumatic valve 12 to ensure the rejected product is directed into the rejection bin 502 before falling in the bottle and without interrupting the working of the tablet manufacturing system.

Figure 5A:
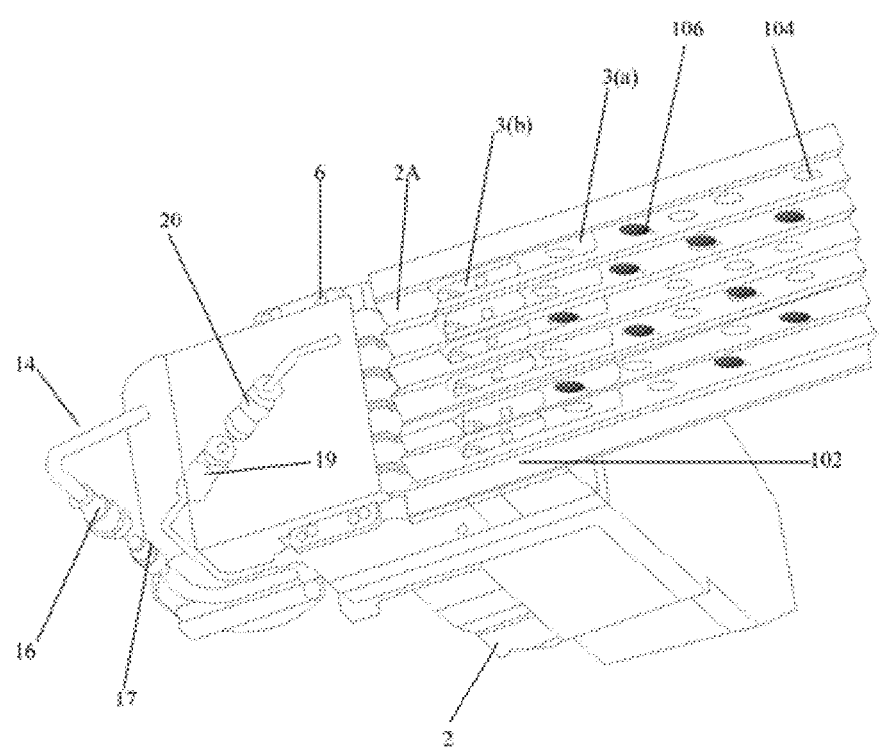
FIG. 5A is a top perspective view of the rejection and verification module illustrating the tray with tablets moving towards the rejection or acceptance area, according to an embodiment of the present invention.
Figure 5B:
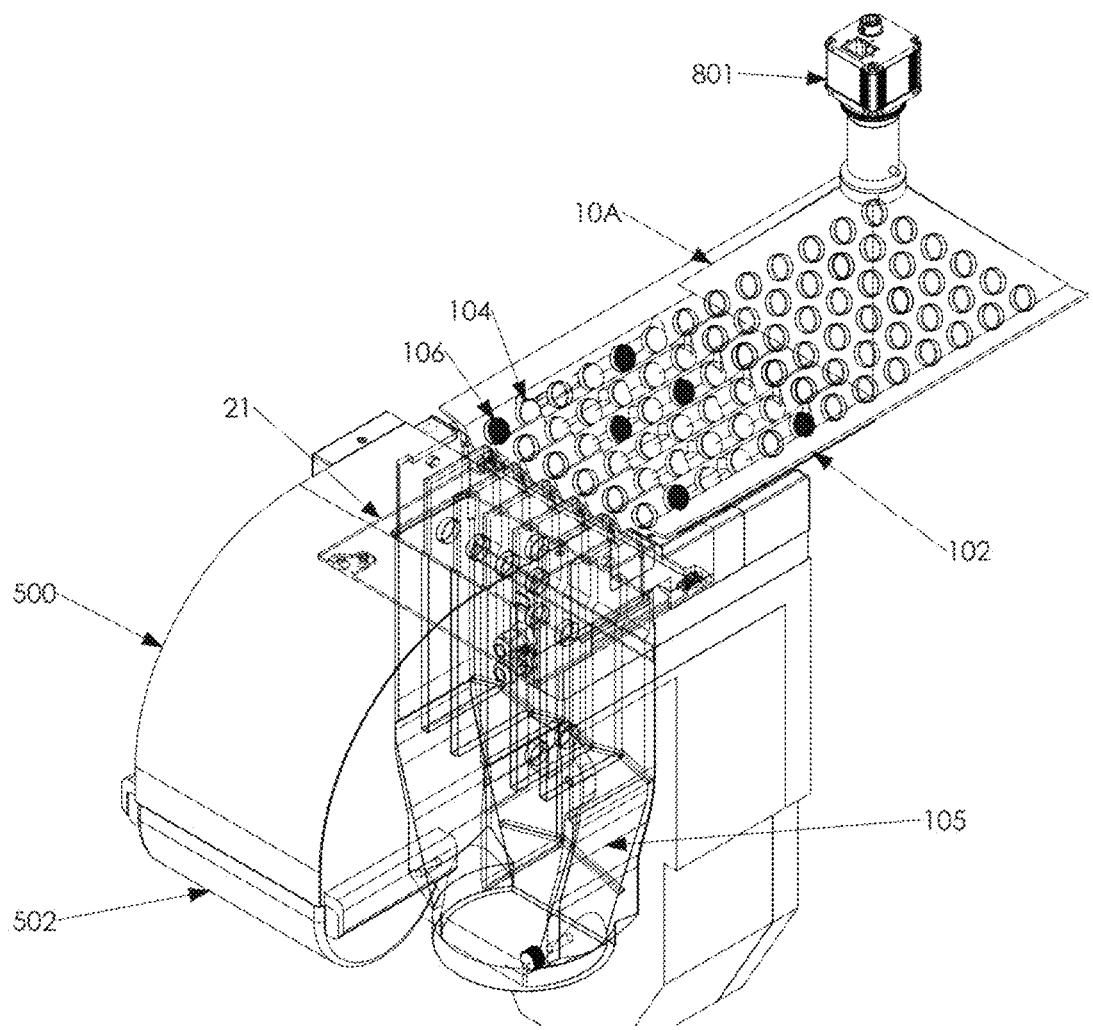
FIG. 5B is a lateral top isometric view of the rejection and verification module which depicts accepted tablets moving to bottle filling funnel, according to an embodiment of the present invention.
Figure 6A:
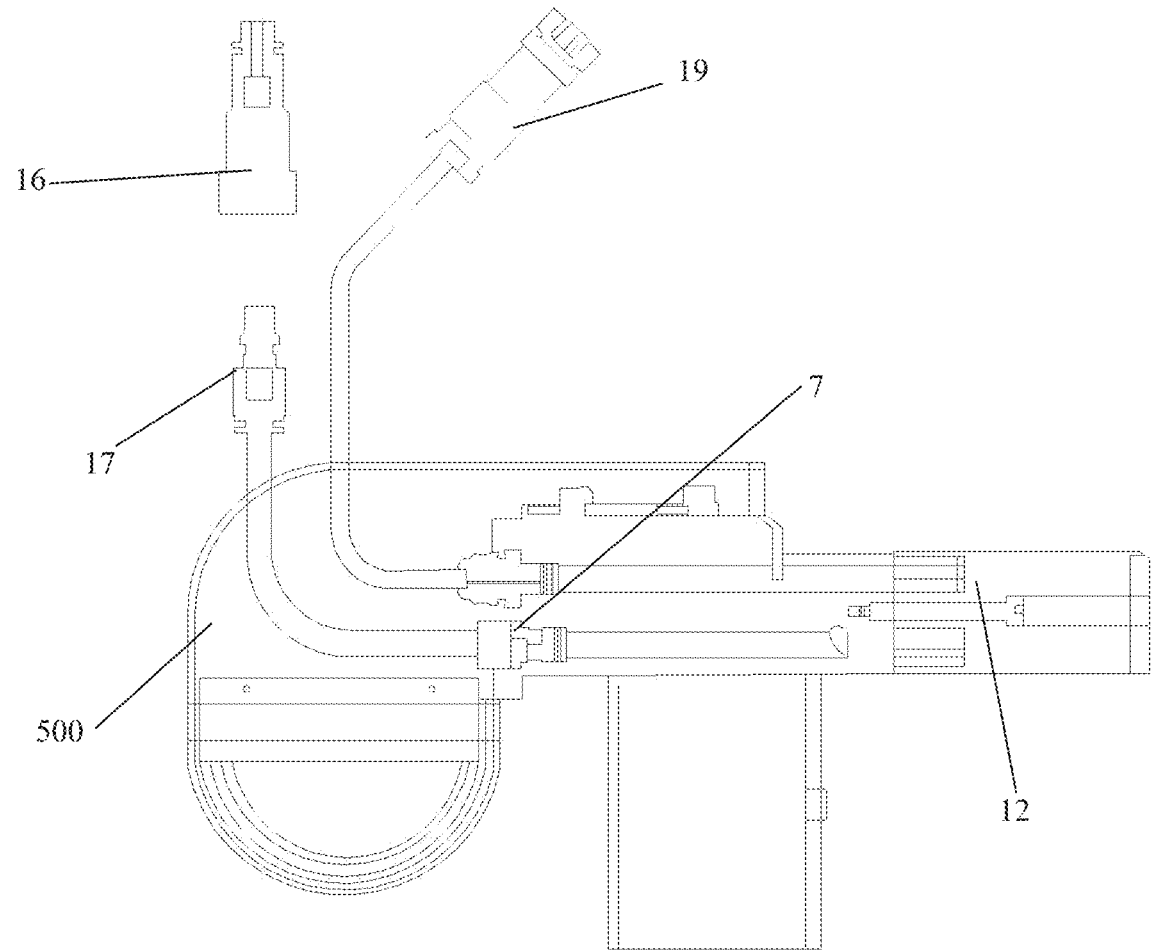
FIG. 6A is cross sectional side view of the rejection and verification module, according to an embodiment of the present invention.
Figure 6B:
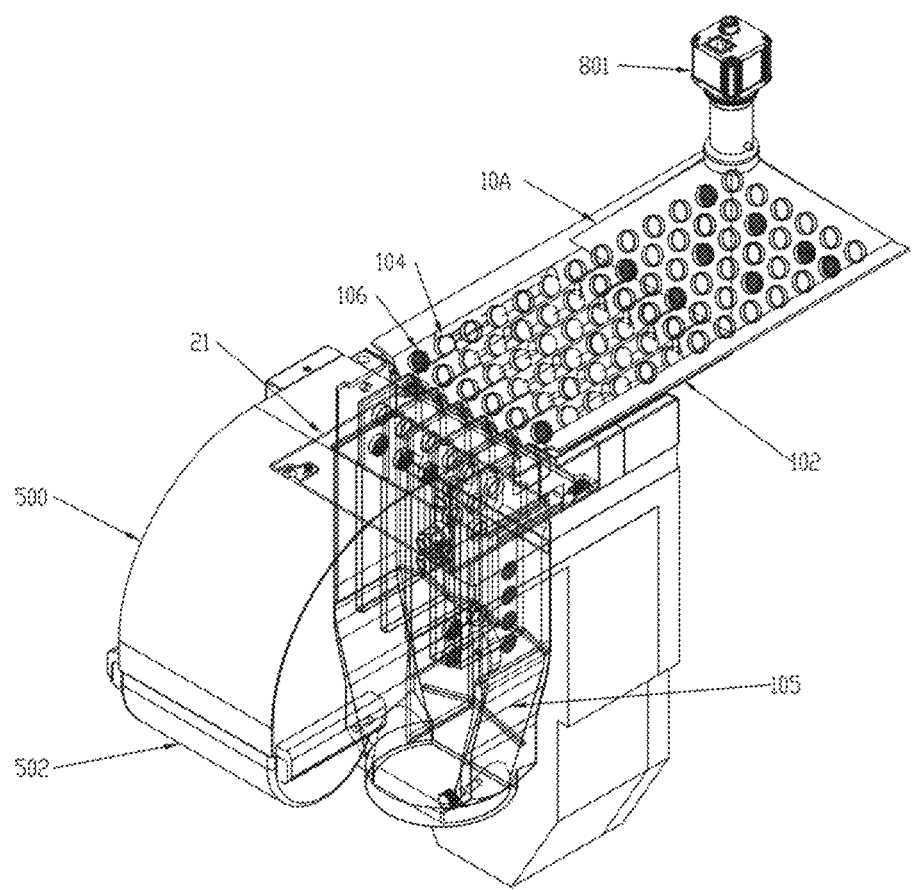
FIG. 6B is a lateral top isometric view of the rejection and verification module which depicts defective tablets falling into the acceptance area which will activate the reject verification, according to an embodiment of the present invention.

As depicted in FIG. 5B, upon receiving a rejection signal from the inspection system (see FIG. 8), the defective product 106 is rejected from the channels 2A of the vibratory tray 102 by a prefixed angle burst of air from the pneumatic air valves 12 associated with each horizontal channel 2A (see FIG. 5A), wherein the defective product 106 is blown into a tablet rejection box assembly 500 with the help of pneumatic valves 12 to ensure rejection of the defective product 106 that travels through the rejection chute 501 into the rejection box assembly 500. The rejected product 106 avoids the verification assembly 300 and is directly pushed by the pneumatic air valve 12 into the rejection box assembly 500. The single channel for tablet detection comprises a circuit board 21 with 4 IR LEDs 23 and 5 IR-diodes 24 (quantity of IR-LED 23 and IR-Diode 24 may vary) and the concept similarly can be applied for multiple channels like 2, 4, 6, 8, 12, 16, 24 and 32. The photoelectric transmitter projects synchronized infrared light beams to a receiver unit. When the object interrupts one or more beams in the sensing field, the control logic gives a beep (buzzer) as an output. The light pulses are both sequenced—one LED is energized after another—and modulated—pulsed at a specific frequency. Here, it is 100 μs (microseconds) per scan. Every 100 μs the microcontroller reads the analog input of the receiver.

The module 100 being magnetically separable into a rejection portion 200, verification portion 300, and rejection collection portion 500, connect by a magnetic locking assembly for easy removal for cleaning without the use of fasteners and tools.

Figure 2B:
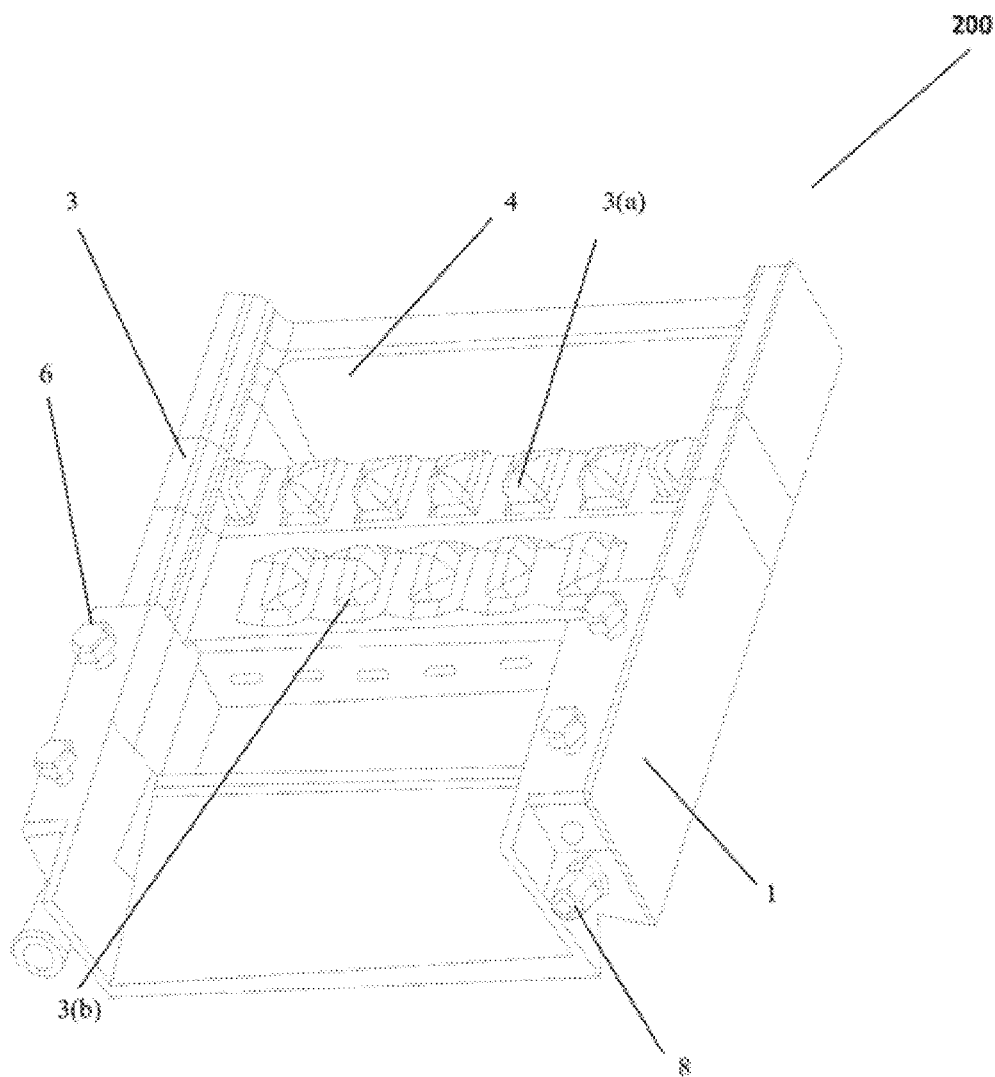
FIG. 2B represents a top view of the rejection portion in accordance with an embodiment of the present invention.
Figure 2C:
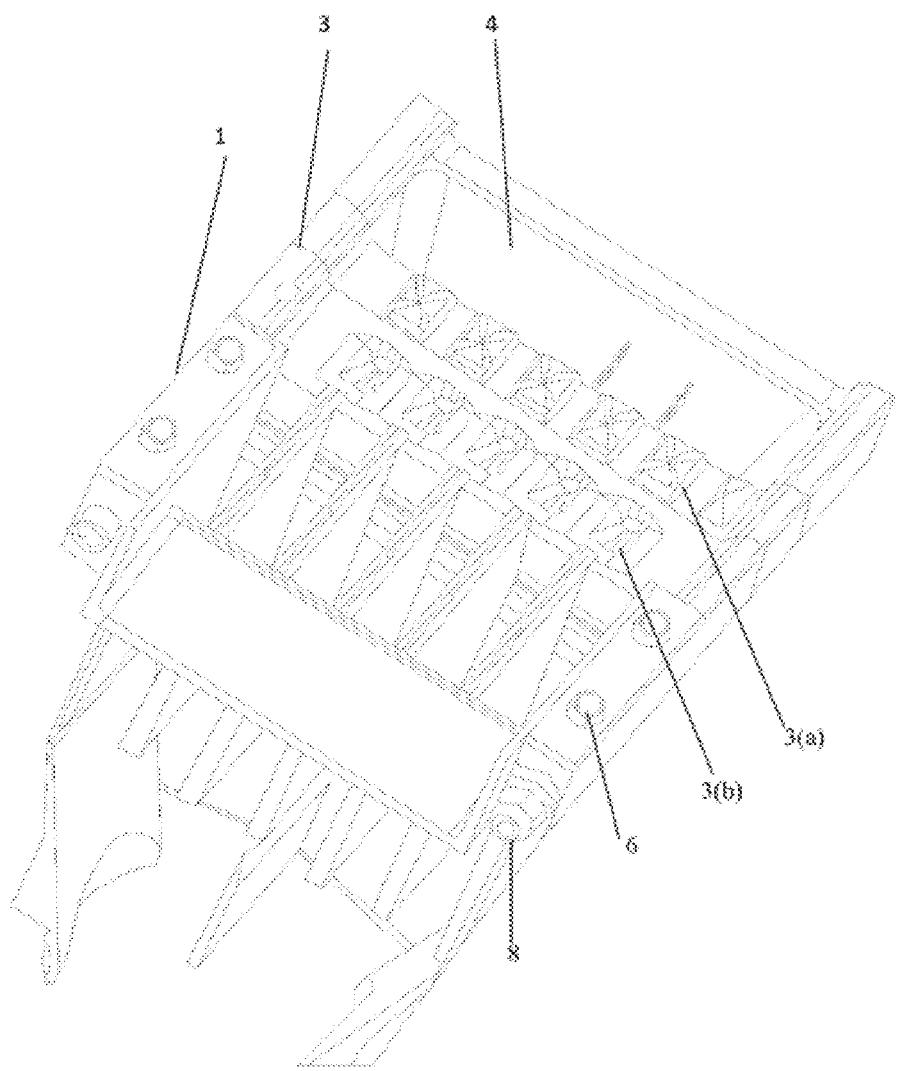
FIG. 2C represents a top view of the verification portion in accordance with an embodiment of the present invention.

With reference to FIG. 2B the horizontal multi-channel tablet approval or rejection segment 200 comprises of a manifold rejection segment 1 which is the main assembly that supports the porting for air valves 12 both pneumatically and electrically. The manifold rejection segment 1 is divided into three parts as show in FIG. 2B. The manifold rejection segment 1 as shown in FIG. 2C allows the vertical product drop funnel verification assembly 2 to easily assemble via square guide tracks and holds the vertical product drop funnel verification assembly 2 in place with magnets 7. The manifold rejection segment cover 3 serves to protect the pneumatic air valves 12 and prevent dust from entering.

As shown in FIG. 2B. There are two types of covers. One cover has orientation bumps as shown in the assembly drawing to help divert the product if it falls outside a 'V', 'U' or flat bottom shaped track, when feeding. The other cover type is a cover with no orientation bumps. The manifold rejection segment end part 4 is designed to allow dust and fallen product to slide downward to a vacuum system or reclaiming system, which is at the rear part of the assembly. The rejection box assembly 500 is also supported with four-location pieces 6 which are mounted to the manifold rejection segment 1, and the rejection box assembly 500 collects the rejected product 106. There are sloped cutouts to allow dust from vibratory feeding trays to be directed to the vacuum discharge chute. The manifold rejection segment 1 has integrated air wash and verification sensors as shown in FIGS. 7A-C.

Figure 2D:
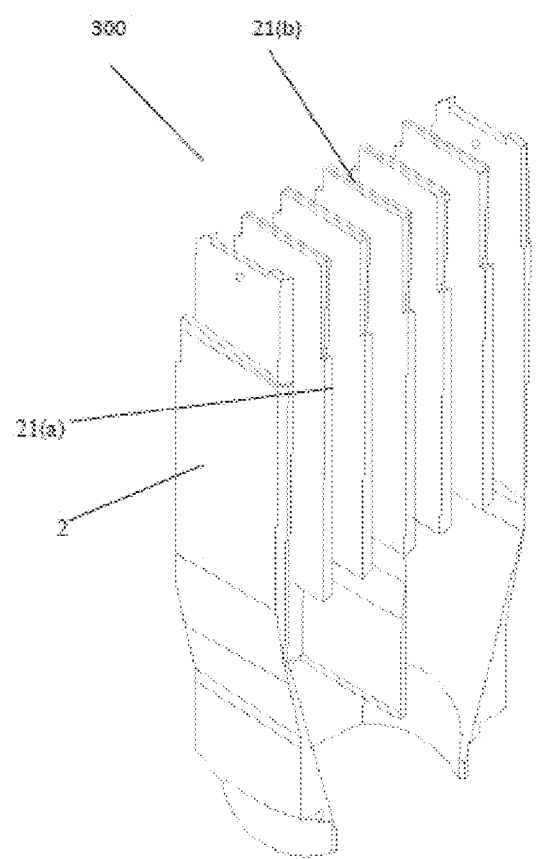
FIG. 2D represents the product verification funnel, that diverts approved tablets into a container in accordance with an embodiment of the present invention.
Figure 2E:
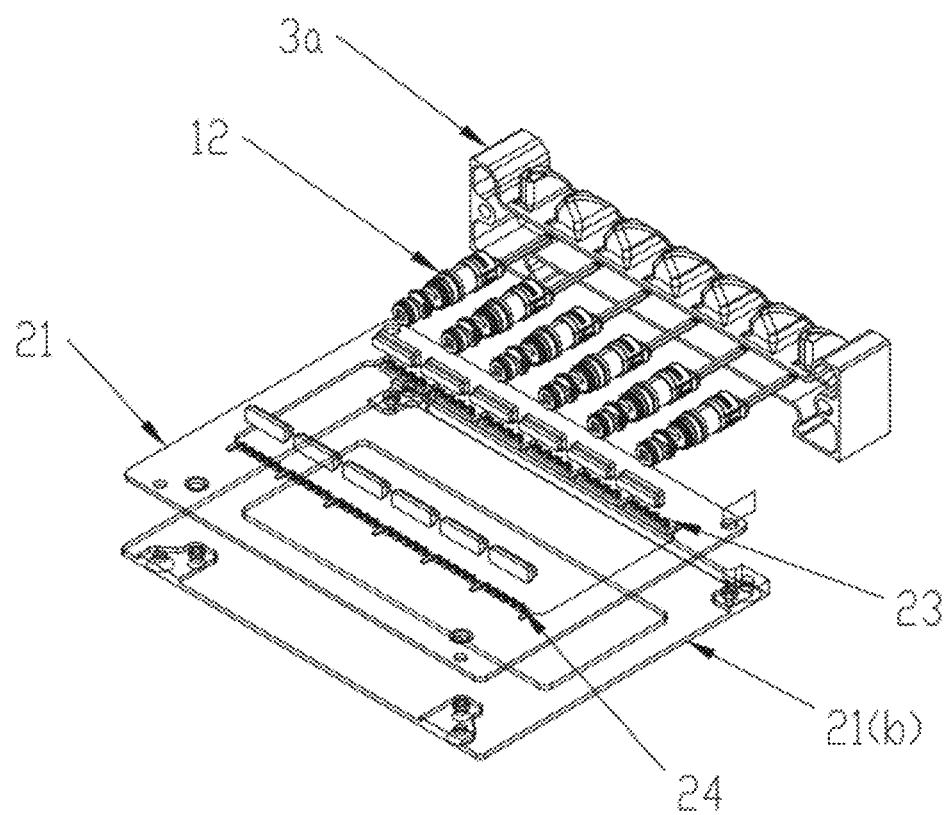
FIG. 2E represents an exploded isometric view of the PCB assembly in accordance with an embodiment of the present invention.
Figure 2F:
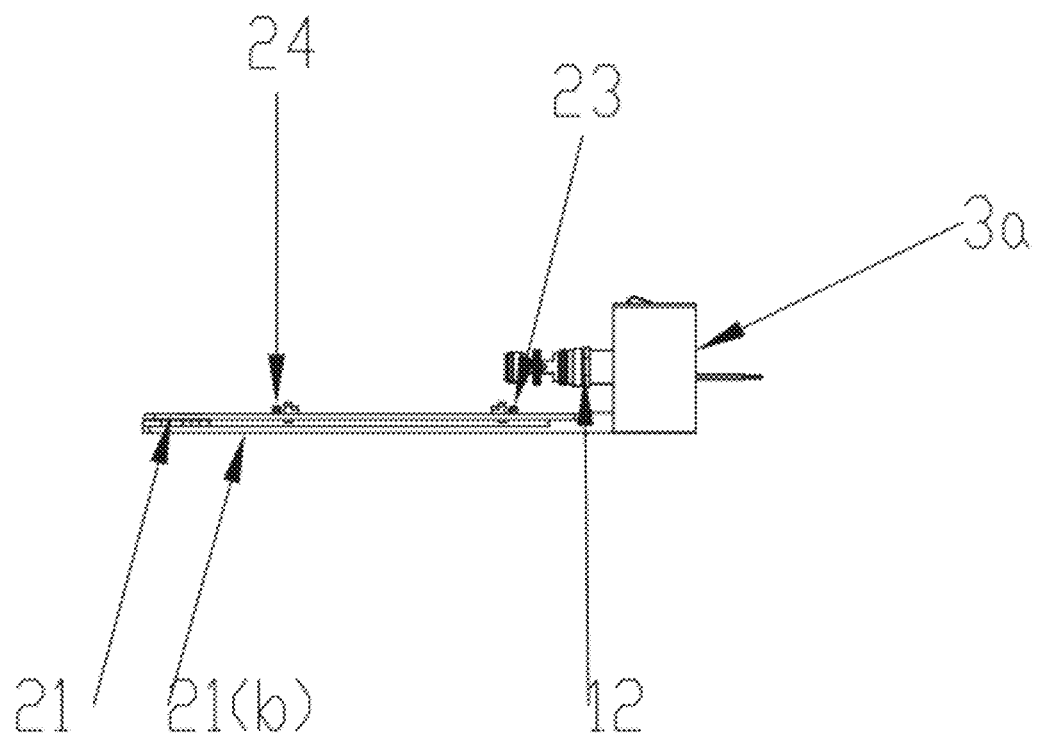
FIG. 2F represents the side view of the PCB assembly in accordance with an embodiment of the present invention.
Figure 2G:
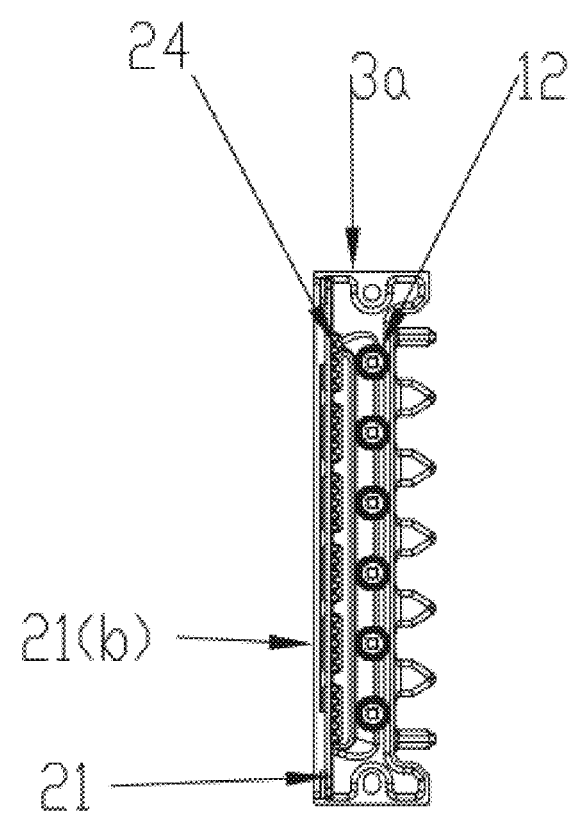
FIG. 2G represents the front view of the PCB assembly in accordance with an embodiment of the present invention.
Figure 2H:
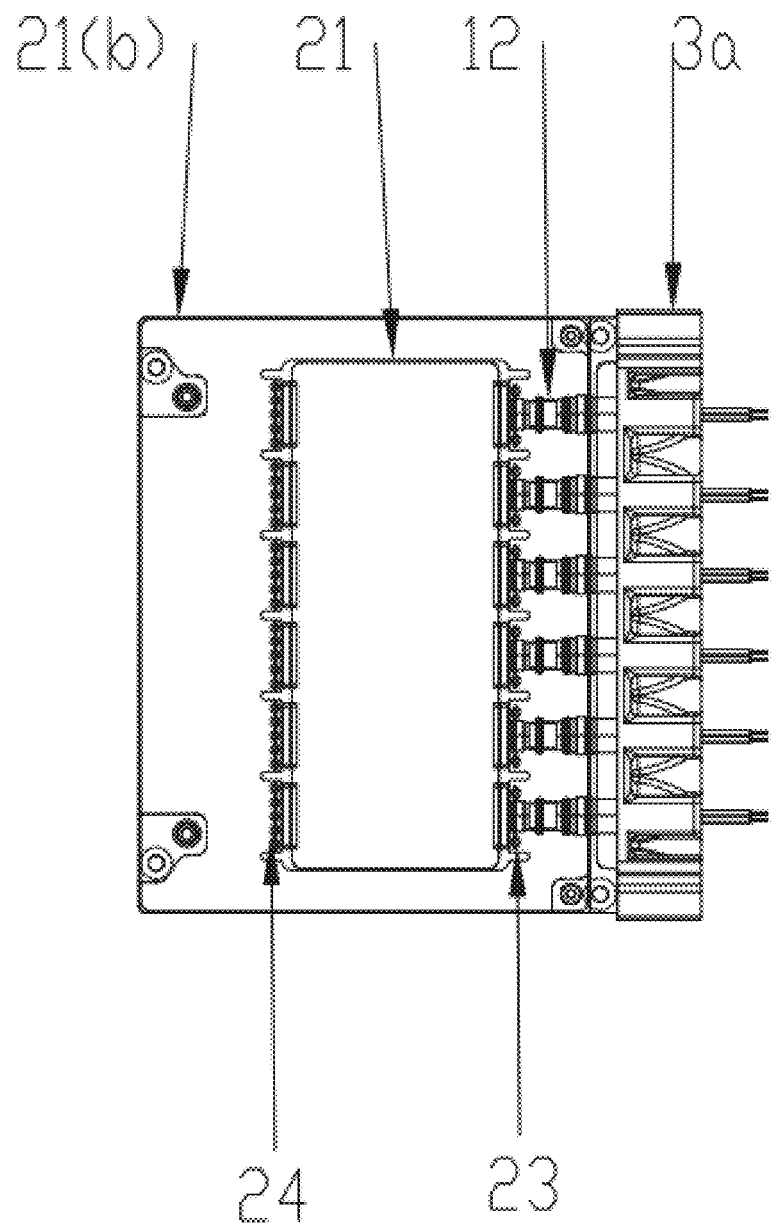
FIG. 2H represents the top view of the PCB assembly in accordance with an embodiment of the present invention.
Figure 2I:
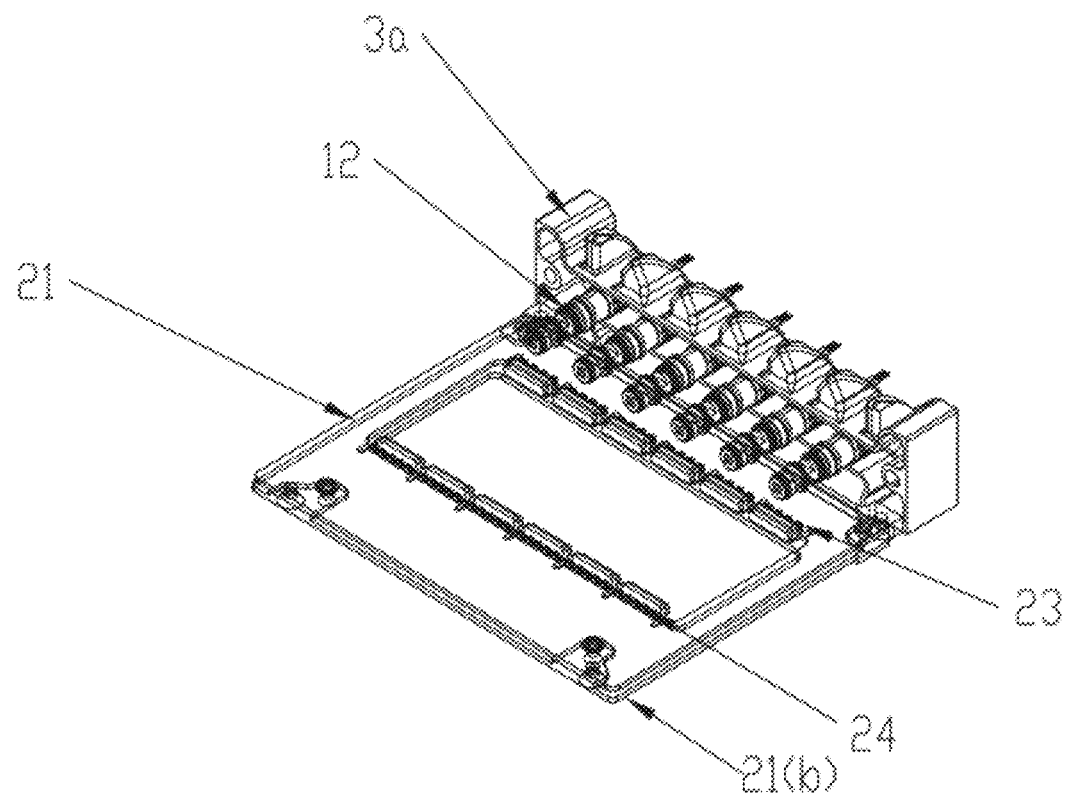
FIG. 2I represents the isometric view of the PCB assembly in accordance with an embodiment of the present invention

The vertical product drop funnel verification assembly 2 as show in FIG. 2A and FIG. 2D in detail is designed to integrate with the tablet filler. It guides good product to the bottles or holding container and guides rejected products to the rejection box assembly 500. The tablet rejection system includes a tablet ejector air valve 12 mounted within the manifold, which blows/ejects the tablet based on the reject signal from the inspection system. The primary tablet counting is done from the inspection system results and these additional sensors 21d will be treated as an error verification that the tablets have been correctly sorted by the rejection mechanism. Any unanticipated object seen by the verification assembly 2 will be detected.

With reference to FIGS. 1, 2D and 7B the vertical multi-channel verification segment 300 and the horizontal multi-channel tablet approval or rejection segment 200 comprise of filling station control 105, dust chamber 21a, high speed valve 12 that shoots the rejected tablet 106 forward, under angle. The reject verification sensor which is located beneath the air rejection nozzles is there to ensure that if a tablet fall is detected during a rejection cycle the entire bottle will be rejected as the system will be notified. A verification sensor is covered with top verification sensor cover, verification middle cover and lower verification cover to protect verification part and also consist of acrylic windows to protect the sensor from dust.

The good tablet(s) 104 fall through their respective verification channel 2, the tablet(s) pass through a horizontal light curtain 21d that communicates the tablet(s) that have been found good during the inspection. The bad tablet(s) 106 avoid the verification channel 2 as they are blown by the air valve 12 into a trajectory into a rejection box assembly 500 through the rejection chute 501, into the rejection collection bin 502 which is the pathway of the blown tablet.

Rejection Mechanism

The Working of the Present Invention:

A modular rejection and verification system 100 comprises a method by which a predetermined rejection criteria of that system communicates which products are to be rejected to the modular device, that rejects the identified product and verifies such rejection was not successful during the rejection cycle and thus communicates to reject the entire bottle during the continuous manufacturing process. A modular rejection and verification system 100 achieves a 100% rejection rate wherein the product advances on a vibratory tray 102 and is inspected by the inspection system 103 and then tracked to the end of the tray where it free falls in a downward motion through the verification segment 300 into the filling control station 105. If a non-conforming product is detected the software tracks and tags this product and as it falls from the end of the tray, the defective product 106 is rejected toward a rejection chute 501 with the help of pneumatic valves 12 wherein the air valves 12 placed for each of the channels blows air under a prefixed angle through the manifold rejection segment 1. If the verification sensor 21d located beneath the air reject port senses a defective product 106 during the rejection cycle then the system communicates to reject the entire bottle during the continuous filling process. The tablet ejector air valve 12 mounted within the manifold controls and sorts the product on the basis of two decisions:

The first decision determines whether the product is good, or should be rejected. In case of the product meets all the parameters then the product is moved along the filling station as shown in FIG. 5A (and FIG. 7A). In case all the parameters are not met the product/tablet is rejected which is an air pressure-based rejection mechanism. As show in FIG. 7B the tablet 106 is diverted/ejected and is blown through the rejection chute 501 and into the rejection bin 502.

The second decision determines whether the defective product has fallen during the rejection cycle FIG. 7C. In case the verification sensor 21d detects such fall then the entire bottle is rejected.

Figure 4:
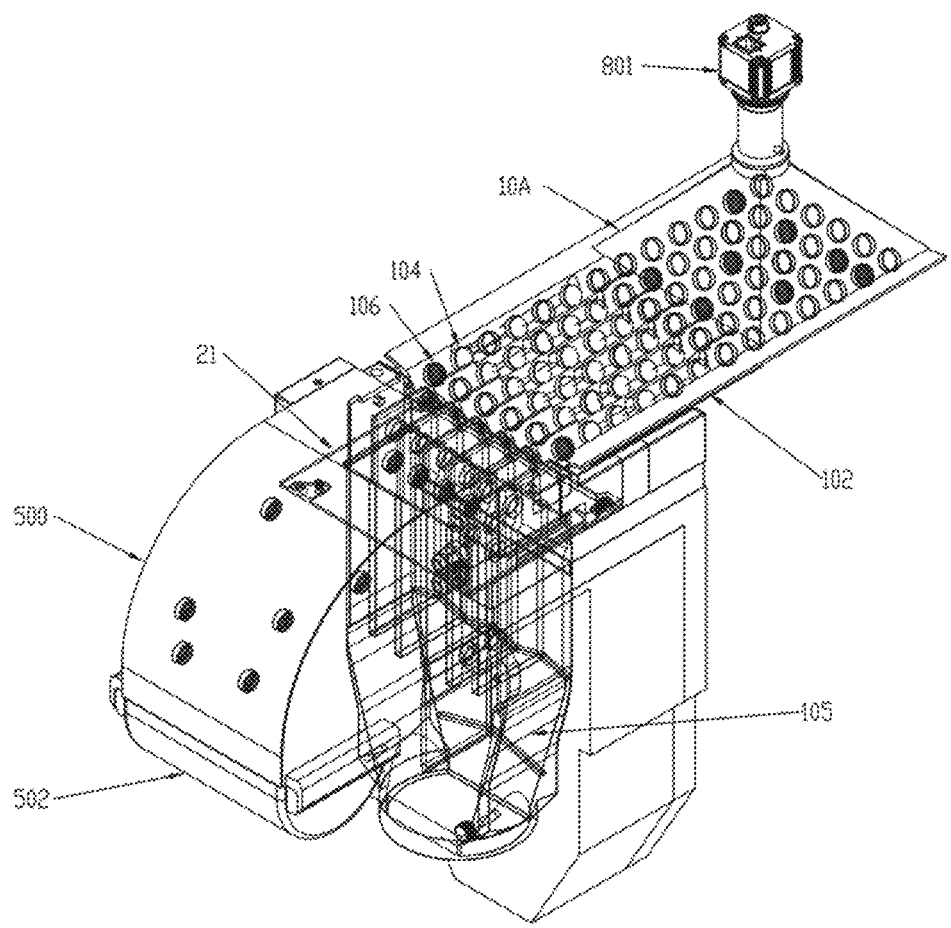
FIG. 4 is the lateral top isometric view of the complete rejection and verification module according to an embodiment of the present invention.

As shown in FIG. 4 if any defects are found in the product, a rejection signal will activate the airblow valve 12 in the specific channel for a predefined duration and the defective product 106 will be collected in the rejection bin 502.

Individual Rejection Mechanism: The individual rejection mechanism in accordance with the present invention is an air pressure based rejection mechanism, which works on a timing-based principle. There are two types of timing, which need to be set for the rejection mechanism to work properly in synchronization with the system software.

Activation Delay: the minimum time taken by the tablet/capsule to traverse from Line-1 to Line-2.

On Duration: the time for which the air jet should remain ON for that particular channel.

The present invention is engineered in a way that allows technology to be used with different vibratory tablet feeding devices. The focus of design has been directed to the ease of cleaning and assembly of parts to meet cGMP guidelines and the ease of operation. Therefore, electrical conductors and pneumatic routing is internal to the device, radius surfaces and no tools are required for disassembly.

The vertical multi-channel verification segment 300 comprises of the verification sensor 21d on both the sides along with middle verification housing, lower verification housing 30, circuit board 21, air reject nozzle 12, and dust chamber 21a. Verification sensor 21d is integrated with a built-in air wash/purge system to reduce the amount of product dust from adhering to the verification sensor 21d. A dual pneumatic purge allows low operational flow to be applied during normal operations. A second purge function is designed to purge excess dust from adhering to the verification sensor 21d manually or automatically via software parameters.

Figure 9:
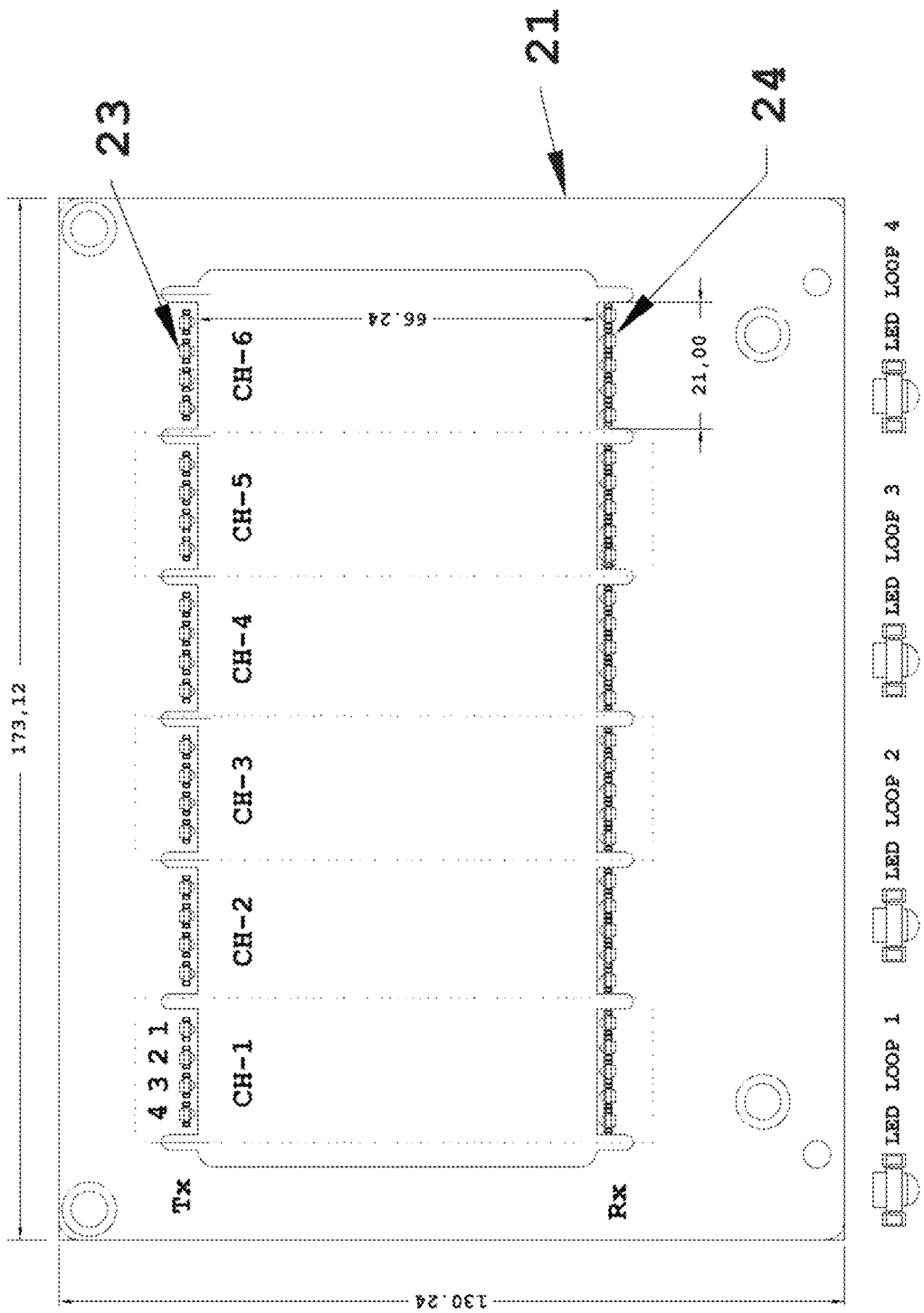
FIG. 9 is a perspective view of an E-Board with six identical sensing channels with four IR LEDs and five IR diodes in each channel.

FIG. 9 illustrates a circuit board 21 (an E-board) comprising six identical sensing channels with four IR LEDs 23 and five IR diodes 24 in each channel. As disclosed, the E-board with 4IR LEDs 23 and 5 photo-diodes or IR diodes 24 can also be applied for multiple channels such as 2, 4, 6, 8, 12, 16, 24 and 32. Each channel features a sensing slot of 21 mm (width)×66 mm (length) size. This slot size can be flexible and scalable as per application requirement. The E-board also facilitates industry standard electrical isolated inputs-outputs for machine interface, supports RS-485 based communication, tool-less field programming facility and configurable device addressing. A sensor with an infrared source as an emission-reception makes it more reliable and operate insensitive to the visible light spectrum. This single board has four loops and each loop contains six IR LEDs, each loop is sequentially operated with similar pulse on (TON) duration, which remains configurable in the range of 20 to 1500 µs as per required sensitivity.

Figure 10A:
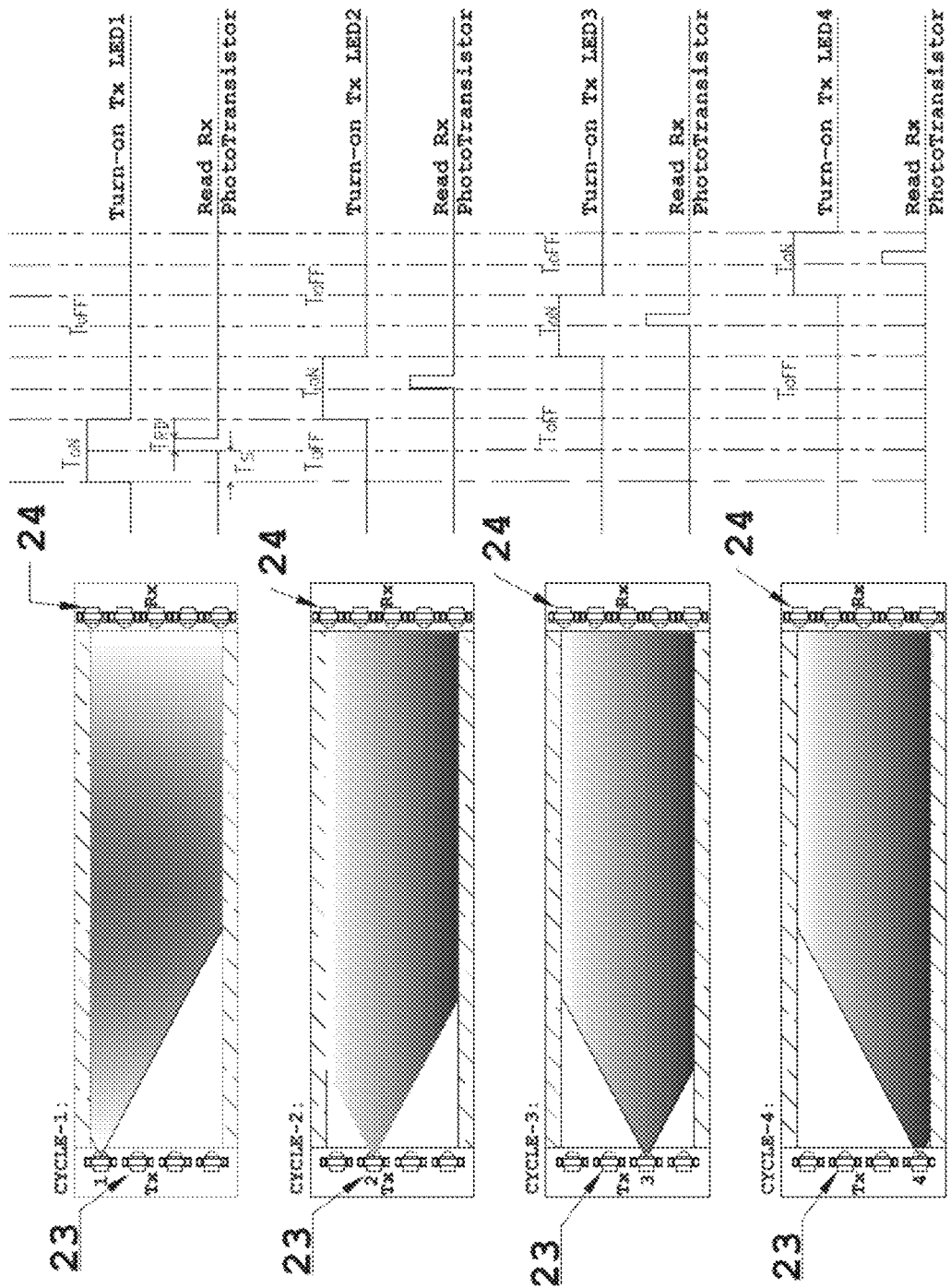
FIG. 10A represents light emitting patterns of all four LEDs for Channel-1 in sequence.

FIG. 10A shows a photoelectric IR-transmitter projects synchronized infrared light beams to an IR-receiver. When any object interrupts one or more beams in the sensing field, the control logic gives a beep (buzzer) as an output. The light pulses are both sequenced—one LED is energized after another—and modulated—pulsed at a specific frequency. Here it is 100 µs (microseconds) per scan. Every 100 µs the microcontroller reads the analog input of the receiver. FIG. 10A shows light emitting patterns of all four LEDs 23 for Channel-1 in sequential operation. As it depicts, a blind window (white) remains present near the transmission area (Tx) when any of the four LEDs 23 are operating, to comply and cover these blind zones all four LEDs 23 remain active and operate sequentially for minor object detection.

Figure 10B:
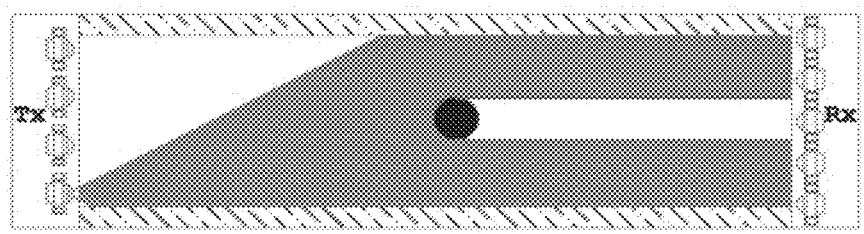
FIG. 10B illustrates the simulation when Led loop-4 is energized and an object is dropped in the sensing area, thus resulting in blocking the IR rays further to the receiver, represented as the white patch in the sensing area.
Figure 10C:
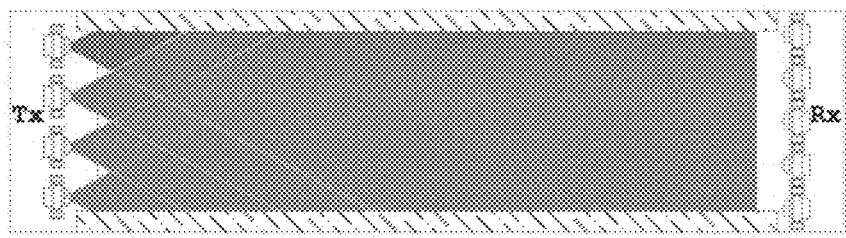
FIG. 10C illustrates the simulation of all four cycles, when all Tx IR Led loops-1 to 4 energized in sequence one after another with high frequency thus covering the whole sensing area without leaving any blind spot.

Further, FIG. 10B illustrates the simulation when Led loop-4 is energized and an object is dropped in the sensing area, thus resulting in blocking the IR rays further to the receiver. It is shown as a white patch in the sensing area. FIG. 10C also illustrates the simulation of all four cycles, when all Tx IR Led loops-1 to 4 are energized in sequence one after another with high frequency thus covering the whole sensing area without leaving any blind spot. This improves the sensitivity of the module 100 to detect the smallest object.

Cycle-1 relates Tx LED loop-1 timing sequence, where the first LED of all six channels operate simultaneously and sends a 60 µs pulse to photoreceptors. This same process continues for the second, third and fourth LED of all six channels. An occurrence of a reading event (TRD) from photoreceptors takes place after a stabilization time (TS) of at least half of the pulse ON duration (TON). This stabilization time ensures complete LED ON duration and peak optical power. Read Time Duration (TRD), typically lasts for 15 s, accounts for sampling, averaging and comparison time for photoreceptors of all Channels-1 to 6 performed sequentially.

The sensor as disclosed performs an auto calibration function on every power-on restart event and read-out channel wise threshold values. The sensor also facilitates an advanced error compensation technique, performs an auto calibration function and auto adjust object detection threshold values in scenarios of lower sensitivity i.e. caused by dust deposited over the surface of the transmitter and receiver. This benefits extended operation hours and minimizes downtime. Furthermore, a loop of auto compensation terminates over a certain level of dust accumulation and alarms to halt the machine to clean the sensing surface manually.

While exemplary embodiments of the present invention have been shown and described, it will be obvious to those with ordinary skills in the art that based upon the teachings herein, changes and modifications may be made without departing from the exemplary embodiments and their broader aspects. Therefore, the appended claims are intended to encompass within their scope all such changes and modifications as are within the true spirit and scope of the exemplary embodiments of the present invention.

What is claimed is:

1. A modular rejection and verification tablet inspection and filling device comprising:
   a module attachable to an existing manufacturing and inspection system, wherein the manufacturing and inspection system includes a conveyor system comprising a hopper and a vibratory tray, and a real time vision inspection system;

the module comprises a verification segment and a rejection segment;

wherein the rejection segment is horizontally connected magnetically to the verification segment;

the rejection segment operates as an air pressure based rejection mechanism; and the verification segment comprises sensors for verification of one or more rejected tablets falling into a bottle filling machine.

2. The modular rejection and verification tablet inspection and filling device according to claim 1, wherein the rejection segment comprises: a manifold rejection segment, a manifold rejection segment cover further comprising a dust port and a tablet diverter, and an air reject nozzle.

3. The modular rejection and verification tablet inspection and filling device according to claim 2, wherein the air reject nozzle blows or rejects a defective tablet under a prefixed angle and the defective tablet is blown in a trajectory directly into a rejection bin upon receiving a signal from the real time vision inspection system.

4. The modular rejection and verification tablet inspection and filling device according to claim 1, wherein the verification segment comprises:

a verification sensor attached on each of two sides of the verification segment, a lower verification housing, and a circuit board.

5. The modular rejection and verification tablet inspection and filling device according to claim 4, wherein the verification sensor detects the one or more rejected tablets falling into an acceptance area.

6. The modular rejection and verification tablet inspection and filling device according to claim 1, wherein an air valve blows or rejects a defective tablet under a prefixed angle and the defective tablet is blown in a trajectory directly into a rejection bin upon receiving a signal from the real time vision inspection system.

7. The modular rejection and verification tablet inspection and filling device according to claim 1, wherein the sensors comprise a verification sensor that detects the one or more rejected tablets falling into an acceptance area.

8. The modular rejection and verification tablet inspection and filling device according to claim 1, wherein the rejection segment and the verification segment are magnetically detachable and assembled.

9. The modular rejection and verification tablet inspection and filling device according to claim 1, wherein the verification segment is vertically disposed and multi-channeled.

10. A method for a rejection and verification tablet inspection and filling device according to claim 1, wherein the real time vision inspection system inspects moving product on the vibratory tray and identifies product as good or defective, and the real time vision inspection system triggers a rejection signal of one or more defective tablets as identified, the method comprising the steps of:

the real time vision inspection system triggering a rejection signal of one or more defective tablets as identified, wherein if the one or more defective tablets falls through a verification channel and further passes through a horizontal light curtain of sensors, the horizontal light curtain of sensors further sending a reject verification signal to the real time vision inspection system to discard an entire bottle.

\* \* \* \* \*